(12) United States Patent
Itakura et al.

(10) Patent No.: US 7,924,335 B2
(45) Date of Patent: Apr. 12, 2011

(54) SOLID STATE IMAGING DEVICE AND METHOD OF DRIVING THE SOLID STATE IMAGING DEVICE

(75) Inventors: Keijirou Itakura, Osaka (JP); Kenichi Shimomura, Hyogo (JP)

(73) Assignee: Panasonic Corporation, Osaka (JP)

( * ) Notice: Subject to any disclaimer, the term of this patent is extended or adjusted under 35 U.S.C. 154(b) by 441 days.

(21) Appl. No.: 12/178,324

(22) Filed: Jul. 23, 2008

(65) Prior Publication Data

US 2009/0027533 A1 Jan. 29, 2009

(30) Foreign Application Priority Data

Jul. 26, 2007 (JP) .................................. 2007-194241

(51) Int. Cl.
*H04N 3/14* (2006.01)
*H04N 5/335* (2006.01)
*H01L 27/00* (2006.01)
*H03M 1/34* (2006.01)

(52) U.S. Cl. ...... 348/308; 348/297; 341/164; 250/208.1

(58) Field of Classification Search ............... 348/218.1, 348/229.1, 230.1, 308, 302, 297; 250/208.1; 341/155, 164, 165, 166
See application file for complete search history.

(56) References Cited

U.S. PATENT DOCUMENTS

| 5,877,715 | A * | 3/1999 | Gowda et al. ................. 341/122 |
|---|---|---|---|
| 5,920,274 | A * | 7/1999 | Gowda et al. ................. 341/155 |
| 6,344,877 | B1 * | 2/2002 | Gowda et al. ................. 348/245 |
| 6,965,407 | B2 * | 11/2005 | Boemler et al. ............. 348/302 |
| 7,088,279 | B2 * | 8/2006 | Muramatsu et al. .......... 341/155 |
| 7,129,883 | B2 * | 10/2006 | Muramatsu et al. .......... 341/164 |
| 7,242,820 | B2 * | 7/2007 | Nam ............................. 382/312 |
| 7,310,452 | B2 * | 12/2007 | Nam ............................. 382/312 |
| 7,315,273 | B2 * | 1/2008 | Muramatsu et al. .......... 341/164 |
| 7,321,329 | B2 * | 1/2008 | Tooyama et al. ............. 341/163 |
| 7,324,033 | B2 * | 1/2008 | Asayama et al. ............. 341/145 |
| 7,375,672 | B2 * | 5/2008 | Muramatsu et al. .......... 341/164 |
| 7,379,011 | B2 * | 5/2008 | Ham et al. .................... 341/170 |
| 7,471,230 | B2 * | 12/2008 | Tooyama et al. ............. 341/164 |
| 7,518,646 | B2 * | 4/2009 | Zarnowski et al. ........... 348/302 |
| 7,554,476 | B2 * | 6/2009 | Inada ............................ 341/156 |
| 7,567,280 | B2 * | 7/2009 | Muramatsu et al. .......... 348/294 |
| 7,623,173 | B2 * | 11/2009 | Nitta et al. .................... 348/302 |
| 7,629,914 | B2 * | 12/2009 | Muramatsu et al. .......... 341/164 |
| 7,642,947 | B2 * | 1/2010 | Suzuki et al. ................ 341/169 |
| 7,683,818 | B2 * | 3/2010 | Muramatsu et al. .......... 341/164 |
| 7,710,479 | B2 * | 5/2010 | Nitta et al. .................... 348/302 |

(Continued)

FOREIGN PATENT DOCUMENTS

JP 2006-033452 2/2006

(Continued)

*Primary Examiner* — John M Villecco

(74) *Attorney, Agent, or Firm* — McDermott Will & Emery LLP

(57) ABSTRACT

A row scanner selects an arbitrary row in an pixel array unit. Per-column AD converters separately convert voltage signals respectively outputted from a column of a plurality of unit pixels in the selected arbitrary row into digital signals. A column scanner sequentially outputs the digital signals by a column-scanning operation thereof. An AD conversion result adjuster judges whether or not the digital signals reach a predetermined judgment value or the status equivalent to the digital signals reaching the predetermined judgment value is generated, and fixes the digital signals to digital pixel values set in accordance with the predetermined judgment value when a result of the judgment is positive.

23 Claims, 14 Drawing Sheets

U.S. PATENT DOCUMENTS

| | | | |
|---|---|---|---|
| 7,777,170 B2* | 8/2010 | Murakami et al. | 250/208.1 |
| 7,786,921 B2* | 8/2010 | Nitta et al. | 341/164 |
| 7,791,524 B2* | 9/2010 | Kasuga et al. | 341/156 |
| 2005/0253942 A1* | 11/2005 | Muramatsu et al. | 348/273 |
| 2006/0012507 A1* | 1/2006 | Nitta et al. | 341/156 |
| 2006/0012698 A1* | 1/2006 | Nitta et al. | 348/308 |
| 2006/0134485 A1* | 6/2006 | Horiuchi et al. | 429/26 |
| 2006/0214086 A1* | 9/2006 | Fukushima | 250/208.1 |
| 2006/0284999 A1* | 12/2006 | Muramatsu et al. | 348/308 |
| 2007/0008206 A1* | 1/2007 | Tooyama et al. | 341/155 |
| 2007/0019091 A1* | 1/2007 | Muramatsu et al. | 348/308 |
| 2007/0024728 A1* | 2/2007 | Muramatsu et al. | 348/308 |
| 2007/0024729 A1* | 2/2007 | Muramatsu et al. | 348/308 |
| 2007/0024730 A1* | 2/2007 | Muramatsu et al. | 348/308 |
| 2007/0024731 A1* | 2/2007 | Muramatsu et al. | 348/308 |
| 2007/0194962 A1* | 8/2007 | Asayama et al. | 341/144 |
| 2008/0042048 A1* | 2/2008 | Asayama et al. | 250/208.1 |
| 2008/0094271 A1* | 4/2008 | Tooyama et al. | 341/155 |
| 2008/0111905 A1* | 5/2008 | Toyama et al. | 348/308 |
| 2009/0027533 A1* | 1/2009 | Itakura et al. | 348/308 |
| 2010/0194948 A1* | 8/2010 | Murakami et al. | 348/302 |
| 2010/0214462 A1* | 8/2010 | Itakura | 348/302 |
| 2010/0277632 A1* | 11/2010 | Murakami et al. | 348/297 |

FOREIGN PATENT DOCUMENTS

| | | |
|---|---|---|
| JP | 2006-033454 | 2/2006 |

* cited by examiner

F I G. 1
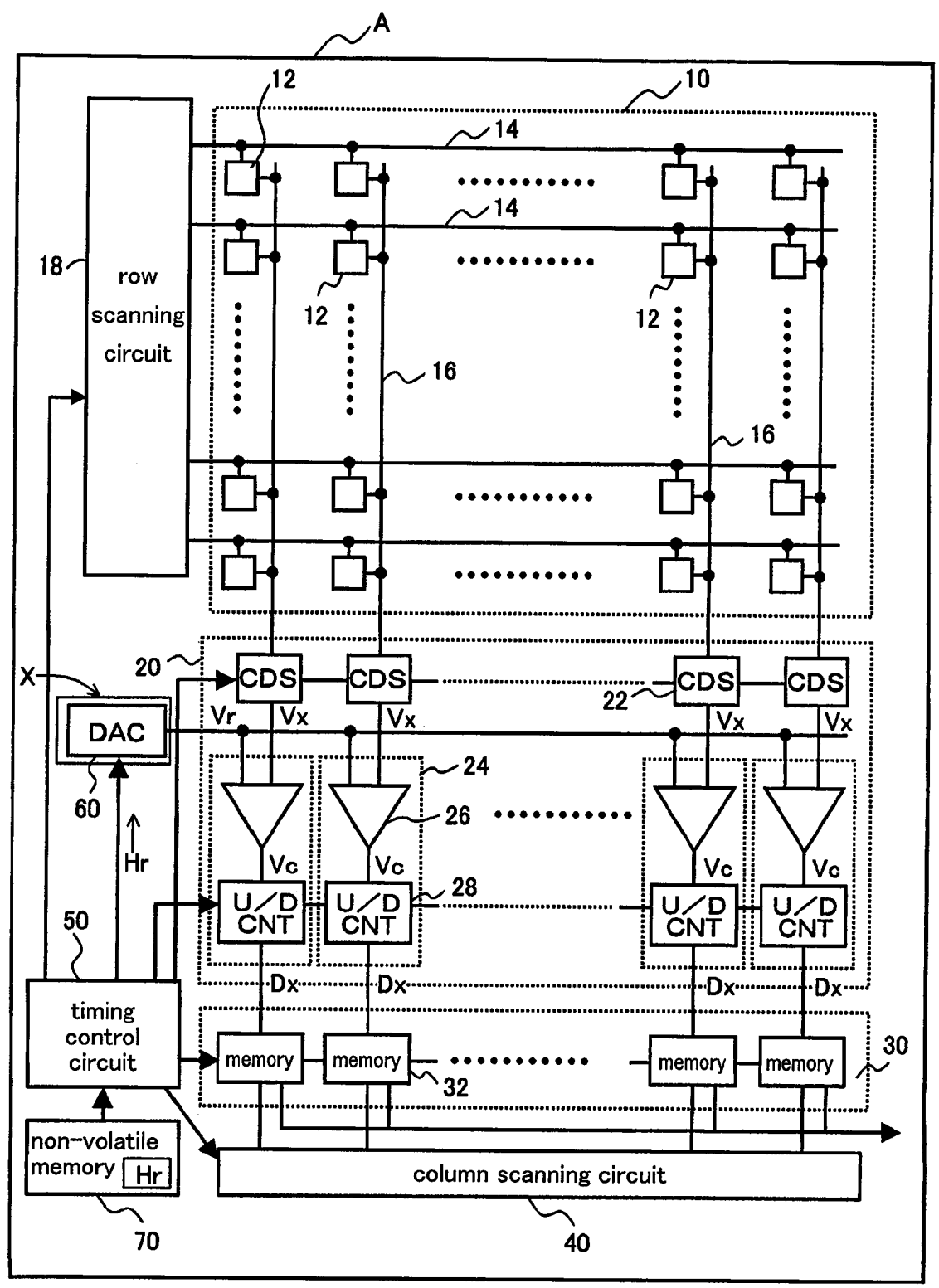

F I G. 2
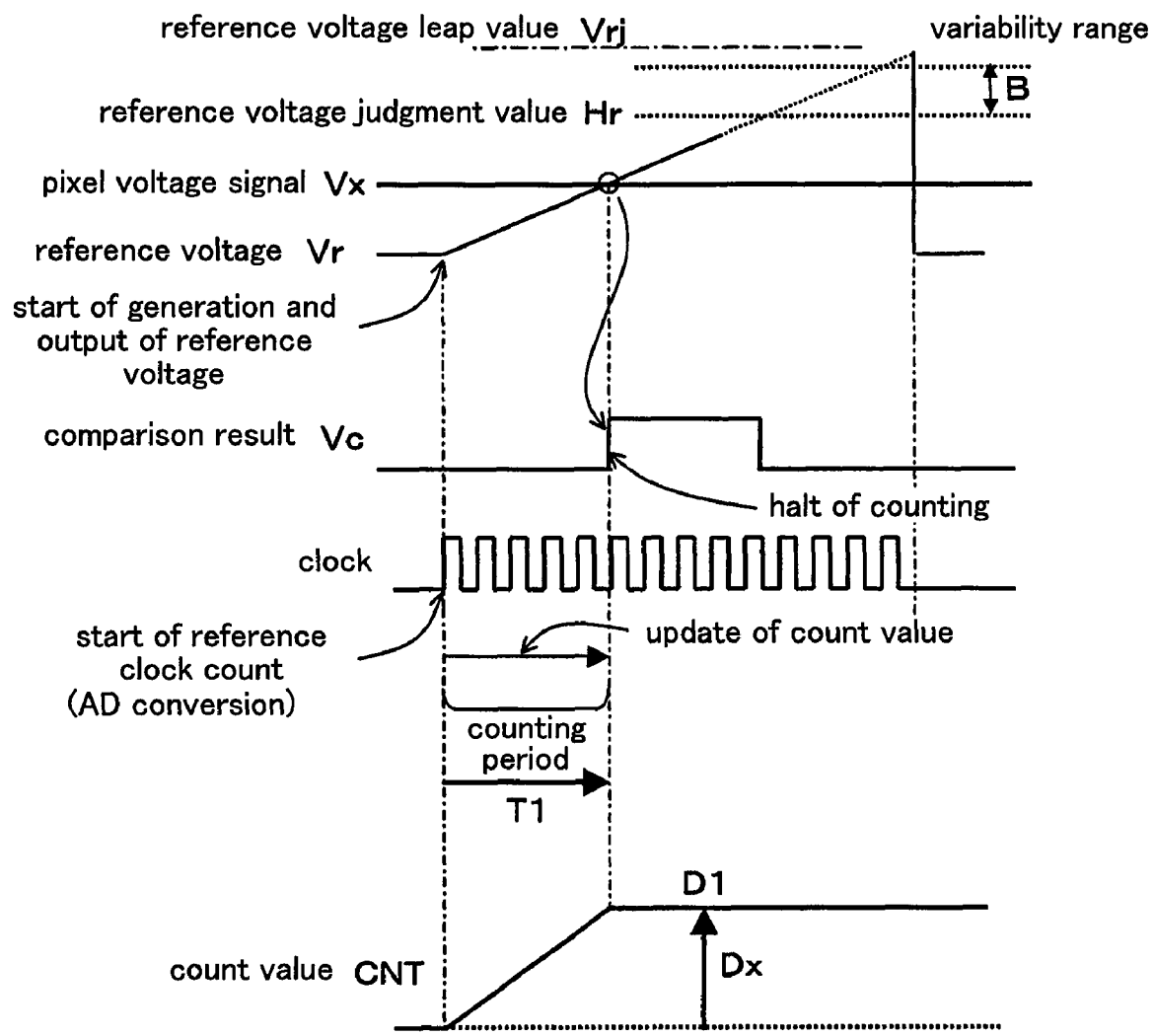

F I G. 3
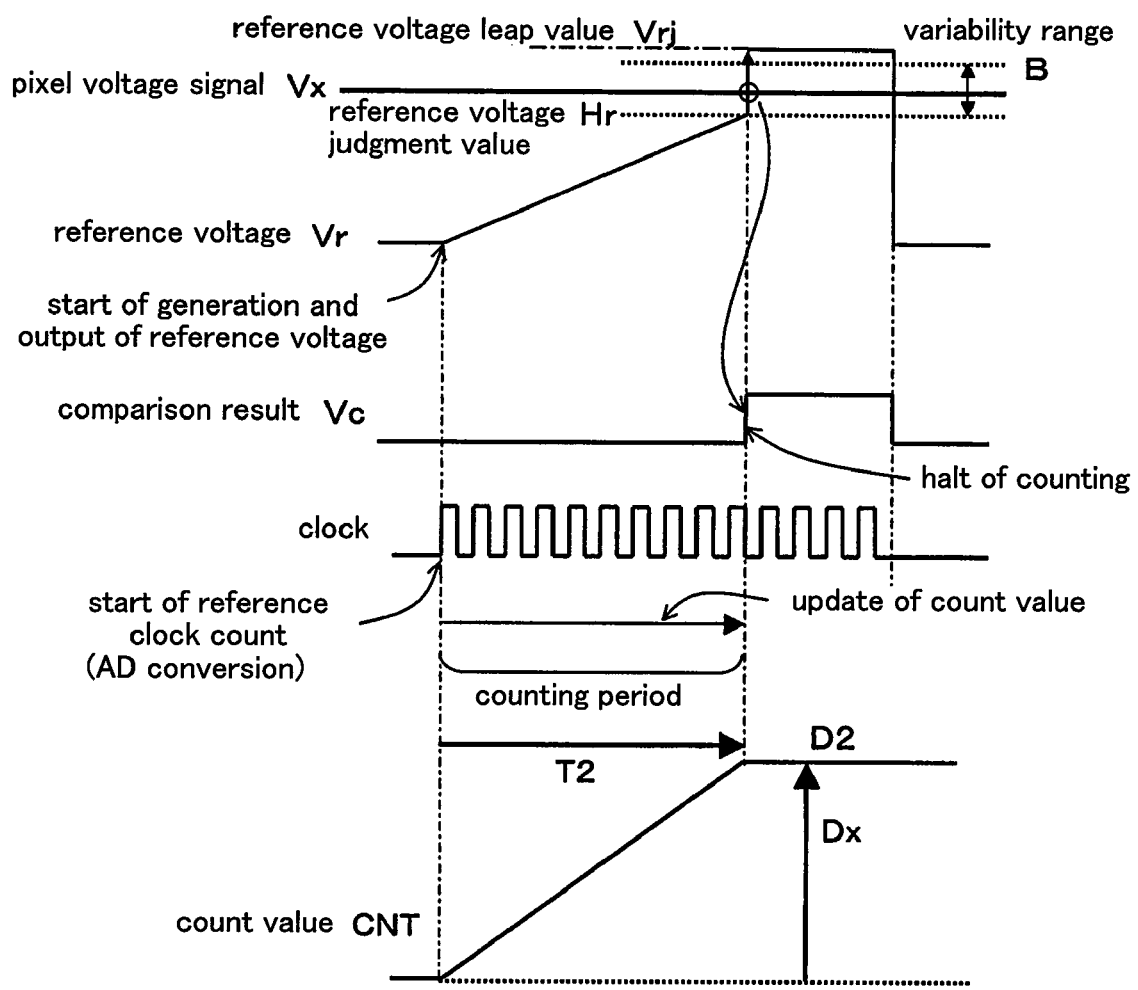

SOLID STATE IMAGING DEVICE AND METHOD OF DRIVING THE SOLID STATE IMAGING DEVICE

BACKGROUND OF THE INVENTION

1. Field of the Invention

The present invention relates to a solid state imaging device comprising an AD converter for each of columns in a pixel array unit where unit pixels each including a photoelectric conversion element are two-dimensionally arrayed in a matrix shape, and a method of driving the solid state imaging device. The technology according to the present invention is particularly suitable for the improvement of the dynamic range.

2. Description of the Related Art

In recent years, a CMOS image sensor provided with a column parallel ADC in which an AD converter is provided in each of columns in a pixel array unit has been developed as a solid state imaging device. The structure of the CMOS image sensor is recited in, for example, No. 2006-33452 of the Japanese Patent Applications Laid-Open.

FIG. 11 is a block diagram illustrating a constitution of a conventional solid state imaging device B. In FIG. 11, 10 denotes a pixel array unit where unit pixels 12 each including a photoelectric conversion element are two-dimensionally arrayed in a matrix shape, 14 denotes a row selecting wire, 16 denotes a column signal wire, 18 denotes a row scanning circuit, and 20 denotes a column AD converter provided with a plurality of analog CDSs (CDS: correlated double sampling) 22 provided for each column and an array of a plurality of AD converters 24 provided for each column. The AD converter 24 comprises a comparator 26 and an up-down counter 28. 30 denotes a line memory which is an array of a plurality of memory cells 32 provided for each column, where an AD conversion result by the AD converter 24 provided for column is temporarily stored. 40 denotes a column scanning circuit, 50 denotes a timing control circuit, 60 denotes a DA converter which generates a reference voltage Vr having a ramp waveform (a waveform having a slope shape).

The unit pixels 12 are arrayed in the two-dimensional matrix shape in the pixel array unit 10, and the unit pixels 12 for one row are respectively connected to the row scanning circuit 18 via the row selecting wires 14. Further, the unit pixels 12 for one column are respectively connected to input terminals of the analog CDS 22 for column in the column AD converter 20 via the column signal wires 16. The output terminal of the analog CDS 22 for each column is connected to one of the two input terminals of the comparator 26 in the AD converter 24 for each column, the output terminal of the DA converter 60 is connected to the other input terminal of the comparator 26, and the output terminal of the comparator 26 is connected to the input terminal of the up-down counter 28.

The reference voltage Vr having a ramp waveform is supplied to the comparators 26 from the DA converter 60, and a pixel signal voltage Vx is outputted from each of the unit pixels 12 via the column signal wire 16 and the analog CDS 22. The comparator 26 compares the pixel signal voltage Vx to the reference voltage Vr having the ramp waveform, and inverts a comparison result Vc when a comparison result shows that the two voltages are equal to each other. The AD conversion is performed through the cooperation of the comparator 26 and the up-down counter 28. The up-down counter 28 has an additional function of temporarily retaining a count value obtained and adding the retained count value to a count value subsequently obtained.

Output terminals of the up-down counters 28 for each column are connected to the memory cells 32 in the line memory 30, and data written in the memory cells 32 after the completion of the AD conversion is sequentially outputted by the column-scan operation by the column scanning circuit 40. The timing control circuit 50 timing-controls the row scanning circuit 18, column AD converter 20, DA converter 60, line memory 30 and column scanning circuit 40.

Next, an operation of the conventional solid state imaging device B thus constituted is described. The description relates to a device driving example in a case where digital double sampling is performed. FIG. 12 is a timing chart illustrating the operation in the foregoing case.

1) First, a counting operation in a first sampling process is described referring to the first-half part of FIG. 12. In the first sampling, a baseline voltage Vt is a judgment target. At that time, the timing control circuit 50 indicates a down count mode to the up-down counters 28, and the up-down counters 28 correspondingly perform down count. In the unit pixels 12 in the row selected by the row scanning circuit 18, the baseline voltage Vt generated in each pixel in the relevant row (corresponding to reset component) is inputted to the comparator 26 via the analog CDS 22. The comparator 26 compares the baseline voltage Vt to the reference voltage Vr (ramp waveform) from the DA converter 60. During the operation described above, the up-down counters 28 continue to down-count the reference clocks. When the reference voltage Vr (ramp waveform) exceeds the baseline voltages Vt, the comparison results Vc outputted from the comparators 26 are inverted to "H" level. The up-down counters 28 halt their counting operations in response to the inversion, and retain count values CNT obtained then as reset components ΔD. Accordingly, the count values CNT additionally include the reset components ΔD in the up-down counters 28. The reset components ΔD correspond to the reference voltages Vt. Because the count values CNT additionally include the reset components ΔD, an inter-pixel variability of offset voltages at the time of no signals is resolved. The reset components ΔD are temporarily retained in the up-down counters 28. When the generation of the reference voltage Vr is halted after a first predetermined time passed, the comparison results Vc return to "L" level.

2) After a second predetermined time (second predetermined time>first predetermined time) has passed, the up-down counters 28 shift to a second sampling process, which is described referring to the latter-half part of FIG. 12. In the second sampling, the pixel signal voltage Vx is the judgment target. At that time, the timing control circuit 50 indicates an up count mode to the up-down counters 28, and the up-down counters 28 correspondingly perform up-count. Analog signals generated at each pixel in the respective unit pixels 12 in the row selected by the row scanning circuit 18 are noise-removed by the respective analog CDSs 22 and inputted to the comparators 26 as the pixel signal voltages Vx. The comparators 26 compare the pixel signal voltages Vx to the reference voltage Vr (ramp waveform) from the DA converter 60. During that operation, the up-down counters 28 continue to up-count the reference clocks. In the counting operations by the up-down counters 28 at the time, the reset components ΔD obtained in the down-counting operation are used as initial values.

When the reference voltage Vr exceeds the pixel signal voltages Vx, the comparison results Vc outputted from the comparators 26 are inverted to "H" level. The up-down counters 28 halt their counting operations in response to the inversion and retain the count values CNT obtained at the time. The count value CNT additionally includes the reset component ΔD obtained in the down-counting. Therefore, a digital pixel value of a regular signal component corresponding to the pixel signal voltage Vx is Dx. In the digital pixel value Dx, the inter-pixel variability is resolved since the reset component is removed therefrom. The digital pixel values Dx are temporarily retained in the respective up-down counters 28. Accordingly, the AD conversion for one pixel is completed, and the obtained digital pixel values Dx are transferred to the memory cells 32 in the respective columns in the line memory 30. The digital pixel value Dx thus generated correspond to a counting period Tx from the start to the halt of the counting operation by the down-counter 28.

The signal processing for each column thus described is executed at once at all of the unit pixels 12 in the selected row in the pixel array unit 10. More specifically, the analog CDSs 22, comparator 26, up-down counters 28 and memory cells 32 in the respective columns are operated in a manner similar to the operation described above, and the digital pixel values Dx corresponding to the analog signals obtained from all of the unit pixels 12 in the selected row are retained in the memory cells 32. Then, the column scanning circuit 40 column-scans the memory cells 32 of the line memory 30, and sequentially outputs pixel data of one selected row outside.

The row to be selected is repeatedly updated by the row scanning circuit 18 so that the pixel signal processing for one selected row described above is executed for all of the selected rows. As a result, digital pixel data for one field can be obtained.

The conventional technology thus described wherein the linearity variability and saturation variability between the pixels are not taken into account in characteristic curves based on light intensity—signal level, is, however, disadvantageous in that the S/N ratio is lowered, which deteriorates an image quality. Below is described the disadvantage. FIG. 13 shows a relationship between an incident light intensity and a signal level resulting from photoelectric conversion (characteristic curves based on light intensity—signal level) in a photoelectric conversion element of the unit pixel 12 in the pixel array unit 10. The signal level is proportional to the light intensity; however, the inter-pixel variability is generated in the linearity and saturation of the signal level when the light intensity exceeds a certain level.

In the description of the operation referring to FIG. 12, the baseline voltage Vt to be judged is substantially below a variability range B of the saturation of the light intensity—signal level in the first sampling. Therefore, the operation is limited to the region where the linearity of the baseline voltage Vt is retained, and the reference voltage Vr can maintain an enough accuracy as an index for judging the baseline voltage Vt. In the case where the pixel signal voltage Vx is below the variability range B in the second sampling, the reference voltage Vr can maintain an enough accuracy as an index for judging the pixel signal voltage Vx in a similar manner. When the pixel signal voltage Vx is within the variability range B, however, the accuracy of the reference voltage Vr as the index for judging the pixel signal voltage Vx is lessened.

Referring to FIG. 14 is given a further description. In a state where the level of the pixel signal voltage Vx is Vx1 which is the lowest level in the variability range B, the counting period is T11, and the digital pixel value Dx is D11. In a state where the level of the pixel signal voltage Vx is V x2 which is an intermediate level in the variability range B, the counting period is T12, and the digital pixel value Dx is D12. In a state where the level of the pixel signal voltage Vx is Vx3 which is the highest level in the variability range B, the counting period is T13, and the digital pixel value Dx is D13. When the level of the pixel signal voltage Vx is thus high and falls within the variability range B, the digital pixel value Dx largely varies. In the case where the level of the pixel signal voltage Vx is within the variability range B, the inter-pixel variability in the characteristic curves based on light intensity—signal level is directly shown in an image signal, resulting in the deterioration of an S/N ratio.

No. 2006-33454 of the Japanese Patent Applications Laid-Open recites the technology for extending the dynamic range by combining long-time and short-time exposure signals. According to the technology, the down-counting and up-counting operations are combined in the sampling process, so that the operation is applicable to both of the long-time exposure signal and short-time exposure signal, as shown in FIG. 15. More specifically, the down-counting and up-counting operations are performed during the detection of the long-time exposure signal, and then, the down-counting and up-counting operations are also performed during the detection of the short-time exposure signal. When the detection of the long-time exposure signal is shifted to the detection of the short-time exposure signal, a memory of the up-down counters 28 are not reset. The down-counting operation (long-time exposure) is performed, the up-counting operation (long-time exposure) is performed, and then, without the reset, the down-counting operation (short-time exposure) and the up-counting operation (short-time exposure) are performed again. Accordingly, a digital pixel value of the long-time exposure signal and a digital pixel value of the short-time exposure signal are combined by the up-down counters 28. As a result of the combination of the long-time and short-time exposure signals, the dynamic range is extended.

Because it takes a long exposure time to obtain a long-time exposure signal, the long-time exposure signal tends to fall within in the inter-pixel variability range B in the characteristic curves based on light intensity—signal level. In that case, an S/N ratio is deteriorated due to the variability of the digital pixel value Dx1; therefore, the image quality is significantly deteriorated though the dynamic range can be extended. Further, in the case where signals having the different exposure times are thus combined in a sensor, it is difficult to reduce the generated variability after the signals are outputted from the sensor.

SUMMARY OF THE INVENTION

Therefore, a main object of the present invention is to improve an image quality.

In order to achieve the foregoing object, a solid state imaging device according to the present invention comprises:

a pixel array unit where unit pixels each including a photoelectric conversion element are two-dimensionally arrayed in a matrix shape;

a row scanner for selecting an arbitrary row in the pixel array unit;

a plurality of column-by-column AD converters for separately converting voltage signals respectively outputted from the plurality of unit pixels in the selected arbitrary row into digital signals;

a column scanner for sequentially column-scanning the digital signals outputted by the plurality of column-by-column AD converters and outputting them;

a controller for timing-controlling the row scanner, the column-by-column AD converters and the column scanner; and an AD conversion result adjuster for judging whether or not the digital signals reach a predetermined judgment value or the status equivalent to the digital signals reaching the predetermined judgment value is generated, and converting the digital signals into digital pixel values set in accordance with the predetermined judgment value when a result of the judgment is positive.

A method of driving a solid state imaging device corresponding to the solid state imaging device according to the present invention includes:

a selecting step for selecting unit pixels on a row-by-row basis in a pixel array unit where the unit pixels each including a photoelectric conversion element are two-dimensionally arrayed in a matrix shape per row;

a converting step for converting voltage signals outputted respectively from a column of the plurality of unit pixels in the row selected in the selecting step into digital signals; and an outputting step for sequentially outputting the digital signals, by a column-scanning operation thereof, wherein in the converting step, it is judged whether or not the digital signals reach a predetermined judgment value or the status equivalent to the digital signals reaching the predetermined judgment value is generated, and the digital signals are fixed to digital pixel values set in accordance with the predetermined judgment value when a result of the judgment is positive.

In the foregoing constitution, the voltage signal may be relatively increased and falls within an inter-pixel variability range in characteristic curves based on light intensity—signal level, which denotes that the digital signal in each pixel reaches the predetermined judgment value. When such a state is generated, the AD conversion result adjuster fixes the digital signal to the digital pixel value set in accordance with the predetermined judgment value. Accordingly, even in the case where the voltage level of the voltage signal (pixel signal) is so high that the digital pixel value may be variable in the conventional processing, the possible variability can be controlled. As a result, the inter-pixel variability may not be directly shown in an image signal, which improves the S/N ratio.

The solid state imaging device may be constituted such that the controller sequentially executes a long-time exposure timing control and a short-time exposure timing control at an identical exposure time point, and the column-by-column AD converters each output a combined digital signal in which the digital signal obtained in the long-time exposure timing control executed earlier and the digital signal obtained in the short-time exposure timing control executed later are combined at the identical exposure time point as the digital signal at the identical exposure time point.

In the foregoing constitution, the long-time exposure timing control and the short-time exposure timing control are executed mainly in order to extend the dynamic range. In the case where the conventional constitution is thus constituted, the digital signal obtained in the long-time exposure timing control may tend to fall within a range where the inter-pixel variability is generated in the characteristic curves based on light intensity—signal level, resulting in the deterioration of the S/N ratio. According to the present invention, however, capturing images in the extended dynamic range can be guaranteed, while the S/N ratio can be secured and a high-quality image is obtained.

The solid state imaging device may be constituted such that the column-by-column AD converters each comprises:

a reference voltage generator for outputting a reference voltage changing over time;

a comparator for comparing each of the voltage signals outputted from a column of the plurality of unit pixels in the selected arbitrary row to the reference voltage; and a counter for counting a clock from a time point when the reference voltage starts to change to a time point when the reference voltage reaches the voltage signal, and outputting a count value thereby obtained as the digital signal.

According to the foregoing constitution, the reference voltage generator generates such a reference voltage having a ramp waveform (waveform having a slope shape) that changes over time, and supplies the generated reference voltage to the comparator. The counter counts the clock from the time point when the reference voltage starts to change to thereby measure time. The comparator compares the reference voltage changing over time to the voltage signal outputted from each unit pixel. When the comparison result by the comparator shows that the reference voltage has reached the voltage signal, the counter halts its counting operation. The counting result thus obtained constitutes the digital signal.

The solid state imaging device may be constituted such that the counters are up-down counters capable of switching between down-counting and up-counting operations. Accordingly, a reset component which may cause the inter-pixel variability of the digital pixel value may be removed on a pixel by pixel basis. As a result, a digital pixel value of a regular pixel signal component in which all of the pixels in the selected row are equally offset can be obtained as the digital signal.

The solid state imaging device may be constituted such that the AD conversion result adjuster judges whether or not the status is generated depending on whether or not the reference voltage reaches a reference voltage judgment value. This constitution refers to a condition that the digital signal is changed to a particular digital pixel value. In order to determine a timing of changing the digital signal to the particular digital pixel value, a component which changes as the counting operation advances should be monitored. The monitoring object may be the digital signal itself or the reference voltage changing over time. In this description, the monitoring object is the reference voltage changing over time, while the reference voltage judgment value is set in advance. At the time when the reference voltage changing over time reaches the reference voltage judgment value, the digital signal is changed to the particular digital pixel value.

The solid state imaging device may be constituted such that the AD conversion result adjuster judges whether or not the status is generated depending on whether or not the reference voltage reaches the reference voltage judgment value, and changes the reference voltage to a value larger than a maximum amplitude of the voltage signal when a result of the judgment is positive. This constitution refers to a constitution wherein the digital signal is changed to the digital pixel value. When the judgment result is positive, the reference voltage is changed to a value larger than the maximum amplitude of the voltage signal. Accordingly, the changed reference voltage is surely larger than the voltage signal regardless of the variability of the voltage signal (pixel signal). According to a result of the detection, showing the above fact, which was obtained by the comparator based on the comparison between the changed reference voltage and the voltage signal, the counter halts its counting operation and determines the obtained counting result. In summary, reference voltage increases→reference voltage has reached reference voltage judgment value→reference voltage changes→comparison result is inverted→counting operation is halted→counting result is determined.

The solid state imaging device may be constituted such that the reference voltage generators each generates a signal in which a voltage arithmetically changes over time as the reference voltage.

The solid state imaging device may be constituted such that the AD conversion result adjuster judges whether or not the status is generated depending on whether or not the count value reaches a threshold value set in accordance with the predetermined judgment value. In this constitution, the monitoring object is the count value which is the AD conversion result by the column-by-column converter. When the count value has reached the predetermined judgment value previously set, the comparator halts its counting operation irrespective of the comparison result between the reference voltage and the voltage signal, and uses the count value as the digital signal.

The solid state imaging device may be constituted such that the predetermined judgment value is set based on a maximum value of the voltage signal at which the voltage signal can maintain a linearity characteristic with respect to an amount of incident light from the photoelectric conversion elements.

The solid state imaging device may further comprise a non-volatile memory capable of memorizing the predetermined judgment value and transferring the memorized predetermined judgment value to the AD conversion result adjuster. Accordingly, the predetermined judgment value is read from the non-volatile memory and set in the AD conversion result adjuster so that the variability of the digital pixel value can be more efficiently controlled by the AD conversion result adjuster. Further, the predetermined judgment value can be retained in the non-volatile memory even though a power source is turned off. As the predetermined judgment value, such a suitable value that does not generate the inter-pixel variability in an inspection step before the shipment, or the like, may be recorded.

The solid state imaging device may be constituted such that the predetermined judgment value is set based on a maximum value of the voltage signal at which the voltage signal can maintain a linearity characteristic with respect to an amount of incident light from the photoelectric conversion elements, and the non-volatile memory memorizes the predetermined judgment value measured when the solid state imaging device is manufactured. Accordingly, the AD conversion in which the S/N ratio is superior in the image data for an entire screen can be realized. Further, an error of the predetermined judgment value generated in each solid state imaging device (individual difference) can be absorbed.

The solid state imaging device may be constituted such that the controller includes a first timing control mode for executing a single exposure timing control at an identical exposure time point and a second timing control mode for sequentially executing a long-time exposure timing control and a short-time exposure timing control at the identical exposure time point, and the AD conversion result adjuster is operated in the second timing control mode. In this constitution, the AD conversion result adjuster is also preferably operated in the first timing control mode. Accordingly, the solid state imaging device can be used in the first and second timing control modes, which is more convenient.

The solid state imaging device may be constituted such that the AD conversion result adjuster sets the reference voltage judgment values which are different to each other between the first timing control mode and the second timing control mode. Further, the AD conversion result adjuster may control the reference voltage generator so that a rate of change over time of the reference voltage in the first timing control mode and a rate of change over time of the reference voltage in the second timing control mode are different to each other. These constitutions enable flexible responses in the extended dynamic range mode.

The solid state imaging device may further comprise a line memory for temporarily memorizing the digital signals between the column-by-column AD converters and the column scanner. Further, the solid state imaging device may be constituted such that the pixel array unit comprises a column signal wire, and a plurality of column-by-column analog CDSs are further provided between the column signal wire and the plurality of column-by-column AD converters.

According to the present invention, when the voltage signal is relatively high and falls within the inter-pixel variability in the characteristic curves based on light intensity—signal level, the AD conversion result adjuster changes the digital signal to the digital pixel value. Therefore, even in such a state that the digital pixel value may vary in the conventional method, the inter-pixel variability can be prevented from directly appearing in the image signal in the present invention. As a result, the S/N ratio is improved, which consequently improves the image quality.

The present invention is particularly effective in the constitution wherein the long-time exposure timing control and the short-time exposure timing control are executed in order to extend the dynamic range. In this constitution, because the digital signal is changed to the digital pixel value, the inter-pixel variability in the characteristic curves based on light intensity—signal level is not shown even in the long-time exposure timing control. As a result, the deterioration of the S/N ratio in the combined digital signal can be prevented.

The solid state imaging device according to the present invention is advantageous in that the saturation variability and linearity variability of the pixel signal in the photoelectric converter can be controlled even in the case where the pixel signal voltage falls within in the variability range of a high signal level. As a result, the S/N ratio is improved, which consequently improves the image quality.

BRIEF DESCRIPTION OF THE DRAWINGS

These and other objects as well as advantages of the invention will become clear by the following description of preferred embodiments of the invention and be specified in the claimed attached hereto. A number of benefits not recited in this specification will come to the attention of the skilled in the art upon the implementation of the present invention.

FIG. 1 is a block diagram illustrating a constitution of a solid state imaging device according to a preferred embodiment 1 of the present invention.

FIG. 2 is a timing chart illustrating an operation in the case where a pixel signal voltage level does not reach a limiting point in the solid state imaging device according to the preferred embodiment 1.

FIG. 3 is a timing chart illustrating an operation in the case where the pixel signal voltage level reaches the limiting point in the solid state imaging device according to the preferred embodiment 1.

DETAILED DESCRIPTION OF THE INVENTION

Figure 4:
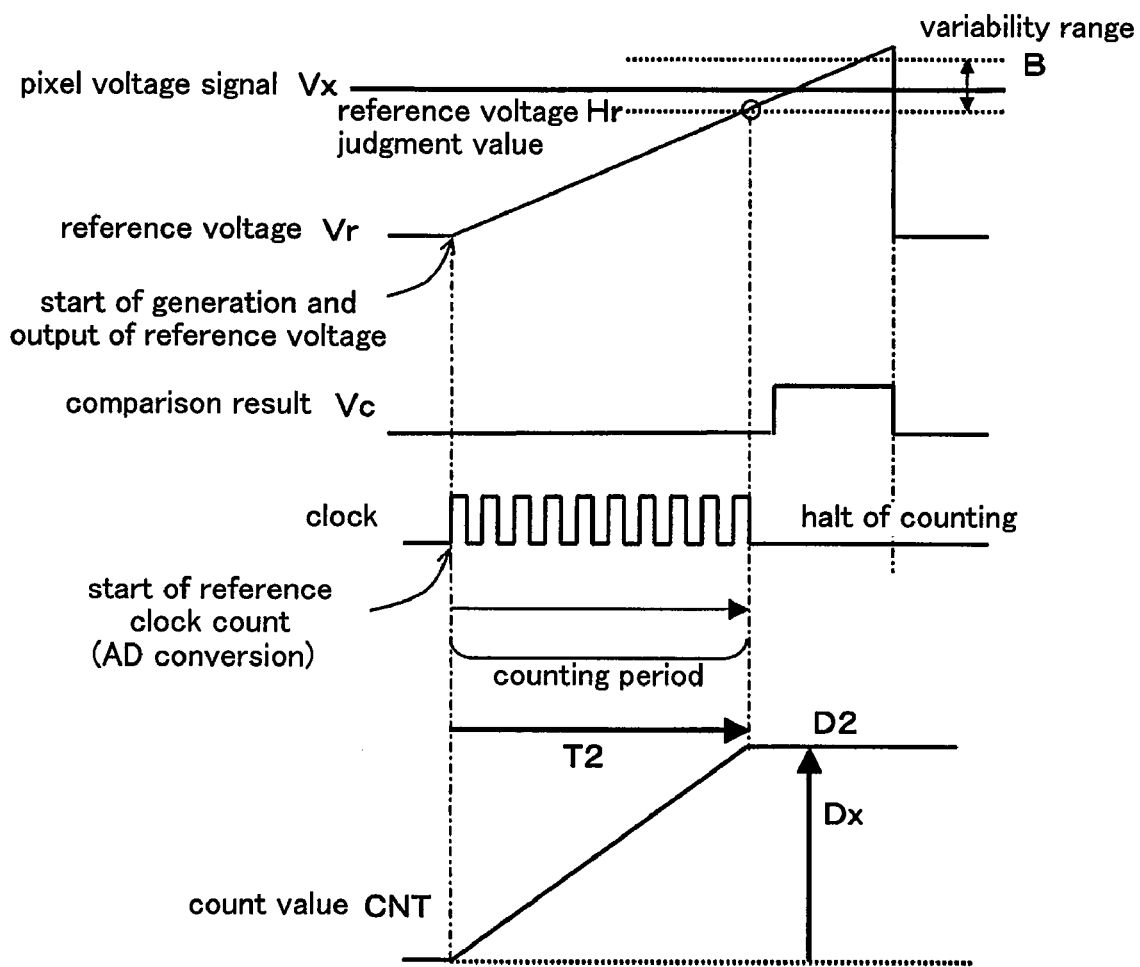
FIG. 4 is a timing chart illustrating an operation in the case where a pixel signal voltage level reaches a limiting point in a solid state imaging device according to a preferred embodiment 2 of the present invention.

Hereinafter, preferred embodiments of the present invention are described referring to the drawings.

Preferred Embodiment 1

FIG. 1 is a block diagram illustrating a constitution of a solid state imaging device A according to a preferred embodiment 1 of the present invention. The solid state imaging device A is constituted as a CMOS image sensor provided with a column parallel ADC. Referring to reference numerals shown in FIG. 1, 10 denotes a pixel array unit, where a plurality of unit pixels 12 each including a photoelectric conversion element are two-dimensionally arrayed in a matrix shape, 14 denotes a row selecting wire, 16 denotes a column signal wire, 18 denotes a row scanning circuit, 20 denotes a column AD converter comprising a plurality of column-by-column analog CDSs 22 and an array of a plurality of column-by-column AD converters 24. The AD converter 24 comprises a comparator 26 and an up-down counter 28. The up-down counter 28 comprises a function of temporarily retaining an obtained count value and a function of adding a count value subsequently obtained to the retained count value.

In FIG. 1, 30 denotes a line memory which comprises an array of a plurality of column-by-column memory cells 32 in which AD conversion results of the column-by-column AD converters 24 are temporarily stored. 40 denotes a column scanning circuit for column-scanning the memory cells 32, 50 denotes a timing control circuit, 60 denotes a DA converter for generating a reference voltage Vr having a ramp waveform (waveform having a slope shape and arithmetically changing over time), and 70 denotes a non-volatile memory in which a reference voltage judgment value Hr is stored. In the pixel array unit 10, the unit pixels 12 for one row each are connected to the row scanning circuit 18 via the row selecting wire 14. The unit pixels 12 for one column each are connected to respective input terminals of the column-by-column analog CDSs 22 in the column AD converter 20 via the column signal wires 16.

The output terminal of the column-by-column analog CDS 22 is connected to one input terminal of the comparator 26 in the column-by-column AD converter 24, the output terminal of the DA converter 60 is connected to the other input terminal of the comparator 26, and the output terminal of the comparator 26 is connected to the input terminal of the up-down counter 28. The reference voltage Vr having the ramp waveform is supplied to the comparator 26 from the DA converter 60. The comparator 26 compares the reference voltage Vr to a pixel signal voltage Vx. The pixel signal voltage Vx, which is a voltage signal, is supplied from each of the unit pixels 12 to the comparator 26 via the column signal wire 16 and the analog CDS 22. The comparator 26 inverts a comparison result Vc when a result of the comparison shows that the reference voltage Vr and the pixel signal voltage Vx are equal to each other. The AD conversion is realized by the cooperative operation of the comparator 26 and the up-down counter 28.

Output terminals of the up-down counters 28 in the respective columns are connected to the memory cells 32 in the line memory 30. A digital pixel value Dx obtained from the AD conversion is written in the memory cell 32. When the digital pixel values Dx obtained from all of the pixels in the row selected by the row scanning circuit 18 are written in the memory cells 32, the digital pixel values Dx are sequentially outputted outside in accordance with a column-scanning operation by the column scanning circuit 40. In the scanning control thus described, the timing control circuit 50 timing-controls the row scanning circuit 18, column AD converter 20, DA converter 60, line memory 50 and column scanning circuit 40.

The present invention is technically characterized in that it is judged whether or not the digital signal in each pixel reaches a predetermined judgment value or the status equivalent to the digital signal reaching the predetermined judgment value is generated, and the AD conversion results of the column-by-column AD converters 24 are fixed to the digital pixel values corresponding to the predetermined judgment value upon the judgment that the status is generated. Such a control operation is executed by an AD conversion result adjuster X.

In the present preferred embodiment, the DA converter 60, which generates and outputs the reference voltage Vr, constitutes the AD conversion result adjuster X. In the present preferred embodiment, "a situation in which the reference voltage Vr reaches the reference voltage judgment value Hr" fits into "the status equivalent to the digital signal in each pixel reaching the predetermined judgment value".

The DA converter 60 serving as the AD conversion result adjuster X:
generates the reference voltage Vr and supplies it to the comparators 26;
monitors the variation of the reference voltage Vr and judges whether or not the reference voltage Vr reaches the reference voltage judgment value Hr; and
switches the control of a rate of change of the reference voltage Vr from a constant rate of change control so far adopted (ramp control) to such a rate of change control that the reference voltage Vr changes to reach a reference voltage leap value Vrj, the moment the reference voltage Vr reaches the reference voltage judgment value Hr.

The data of the reference voltage judgment value Hr is stored in the non-volatile memory 70. The reference voltage judgment value Hr is supplied to the DA converter 60 from the non-volatile memory 70 via the timing control circuit 50. The monitoring operation by the DA converter 60 (monitoring to check if the reference voltage Vr reaches the reference voltage judgment value Hr) and the monitoring operations by the comparators 26 (monitoring to check if the reference voltage Vr reaches the pixel signal voltage Vx) are simultaneously executed. Based on the simultaneous monitoring operations, it is judged which arrives earlier: a timing by which the reference voltage Vr reaches the pixel signal voltage Vx; or a timing by which the reference voltage Vr reaches the reference voltage judgment value Hr. The control mode thereafter is changed depending on a result of the judgment.

As the unit pixel 12, any of three-transistor configuration and four-transistor configuration which are conventionally used and a unit cell comprising a group of pixels provided with a plurality of transistors sharing a photoelectric converter may be adopted. The column-by-column AD converter 24 may have a structure of the ramp run-up method comprising a comparator using a ramp waveform as a reference voltage and a counter, a structure of a successive approximation type, a structure of a cyclic method, or a structure of a $\Delta\Sigma$ modulation method.

An operation of the solid state imaging device A according to the present preferred embodiment thus constituted is described below. The operation described below is based on a single slope operation state, that is, an operation state where digital double sampling is not performed (a bidirectional counting function of the up-down counter 28 is not used).

1) The operation in a state where a level of the pixel signal voltage Vx does not reach a limiting point is described referring to a timing chart shown in FIG. 2. The state where the level of the pixel signal voltage Vx does not reach the limiting point denotes a state where the level of the pixel signal voltage Vx does not reach a variability range B in characteristic curves based on light intensity—signal level.

The timing control circuit 50 timing-controls the row scanning circuit 18, DA converter 60, up-down counters 28, memory cells 32, and column scanning circuit 40. The timing control circuit 50 supplies an initial value, which serves as a reference when the generation of the reference voltage Vr starts, to the DA converter 60, and reads the reference voltage judgment value Hr from the non-volatile memory 70 and sets the read reference voltage judgment value Hr in the DA converter 60.

The row scanning circuit 18 outputs a control signal via the row selecting wire 14 and thereby selects a pixel row from the first row in the pixel array unit 10. Analog signals of a column of pixels in the respective unit pixels 12 in the selected row are respectively supplied to the analog CDSs 22 in the column AD converter 20 via the column signal wires 16. The column-by-column analog CDSs 22 execute the CDS (correlated double sampling) to thereby remove noises included in the respective analog signals. The analog CDSs 22 input the noise-removed analog signals to the respective comparators 26 as the pixel signal voltage Vx.

The DA converter 60 starts to generate the reference voltage Vr having the ramp waveform based on the initial value supplied from the timing control circuit 50. In synchronization with the voltage generation, the timing control circuit 50 gives an instruction to start the up-counting operation to the up-down counters 28. The up-down counters 28 correspondingly start to up-count reference clocks inputted from the timing control circuit 50.

The DA converter 60 supplies the generated reference voltage Vr to the comparators 26. The analog CDSs 22 supply the noise-removed pixel signal voltages Vx to the comparators 26. The comparators 26 compare the pixel signal voltages Vx to the reference voltage Vr, and the up-down counters 28 counts the reference clocks at the same time. A timing by which the up-down counters 28 starts to count the reference clocks synchronizes with a timing by which the DA converter 60 starts to output the reference voltage Vr. At the time, the DA converter 60, which is the AD conversion result adjuster X, monitors the variation of the reference voltage Vr, and judges if the reference voltage Vr reaches the predetermined reference voltage judgment value Hr. In FIG. 2, the pixel signal voltage Vx is lower than a lower-limit value in the variability range B. Therefore, the reference voltage Vr gradually increasing over time reaches the pixel signal voltage Vx before reaching the reference voltage judgment value Hr, in which case there is not any change in the AD conversion results. The comparators 26 supply the comparison results Vc to the up-down counters 28. At a time point when the reference voltage Vr reaches the level of the pixel signal voltage Vx, the comparison results Vc are inverted from "L" level to "H" level. When the comparison results Vc are inverted, the up-down counters 28 halt their up-counting operations. More specifically, the up-counting operation is halted in this case because the reference voltage Vr increasing at a certain rate has exceeded the pixel signal voltage Vx. Therefore, the digital pixel values Dx (=D1) corresponding to the pixel signal voltages Vx are changed to the count values CNT retained by the up-down counters 28 when the up-counting operation is halted. The digital pixel values Dx (=D1) are temporarily memorized in the memory cells 32 in the respective columns in the line memory 30. The digital pixel value Dx (=D1) at the time corresponds to a counting period T1 from the start to the halt of the counting operation by the up-down counter 28. Then, the column scanning circuit 40 column-scans the memory cells 32 in the line memory 30, and sequentially outputs the pixel data for the one selected row outside.

The signal processing thus described is executed to the analog signals outputted from all of the unit pixels 12 in the selected row and the digital pixel values Dx based on the analog signals. More specifically, the column-by-column analog CDSs 22, comparators 26, and up-down counters 28 and memory cells 32 are operated in a manner similar to the foregoing description and the digital pixel values Dx based on the analog signals outputted from all of the unit pixels 12 in the selected row are temporarily retained in the memory cells 32, column-scanned and then outputted outside.

When the update of the row to be selected is repeated by the row scanning circuit 18, the pixel signal processing for one selected row is executed to all of the selected rows. As a result, the digital image data for one field can be obtained.

Summarizing the operation shown in FIG. 2, reference voltage Vr increases→reference voltage Vr reaches reference voltage judgment value Vx→comparison result Vc is inverted→counting operation is halted→digital pixel value Dx is determined based on counting result.

2) The operation in a state where the level of the pixel signal voltage Vx reaches the limiting point is described referring to a timing chart shown in FIG. 3. The state where the level of the pixel signal voltage Vx reaches the limiting point denotes a state where the level of the pixel signal voltage Vx has reached the variability range B in the characteristic curves based on light intensity—signal level.

In the state shown in FIG. 3, the pixel signal voltage Vx is higher than the lower-limit value in the variability range B. As a result, the reference voltage Vr gradually increasing over time reaches the limiting point. At the time, the comparators 26 check whether or not the reference voltage Vr reaches the pixel signal voltages Vx, and the DA converter 60, which is the AD conversion result adjuster X, judges whether or not the reference voltage Vr reaches the reference voltage judgment value Hr. In the state shown in FIG. 3, the timing by which the reference voltage Vr reaches the reference voltage judgment value Hr is earlier than the timing by which the reference voltage Vr reaches pixel signal voltage Vx. The DA converter 60 controls the reference voltage Vr as follows. The DA converter 60 executes such a control operation that the reference voltage Vr is increased at a constant rate of change (ramp control) until the reference voltage Vr reaches the reference voltage judgment value Hr, and executes such a control operation that the reference voltage Vr immediately jumps to the reference voltage leap value Vrj in place of the control operation based on the constant rate of change (ramp control), the moment the reference voltage Vr reaches the reference voltage judgment value Hr. As a result, the reference voltage Vr exceeds the pixel signal voltages Vx at the moment. As a result, the comparison results Vc are inverted, and the up-down counters 28 halt their up-counting operations. The up-counting operation is halted because the reference voltage Vr increasing at the constant rate exceeds the reference voltage judgment value Hr. With the timing at which the up-counting operations are halted, the count values CNT retained by the up-down counters 28 becomes the digital pixel values Dx (=D2) corresponding to the pixel signal voltages Vx. The digital pixel values Dx (=D2) memorized in the memory cells 32 then correspond to a counting period T2. Then, the column scanning circuit 40 column-scans the memory cells in the line memory 30 and sequentially outputs the pixel data for one selected row outside.

The pixel signal processing for one selected row thus described is executed to all of the selected rows by the repeated update of the row to be selected by the row scanting circuit 18. As a result, the digital image data for one field can be obtained.

Summarizing the operation shown in FIG. 3, reference voltage Vr increases→reference voltage reaches reference voltage judgment value Hr→reference voltage Vr jumps to reference voltage leap value Vrj→comparison result is inverted→counting operation is halted→digital pixel value Dx is determined based on counting result.

As a result of the speedy increase of the reference voltage Vr shown in FIG. 3, the variability of the digital pixel values Dx can be controlled. The reference voltage judgment value Hr referred to by the DA converter 60 is read from the non-volatile memory 70 when the timing control circuit 50 controls the DA converter 60, and then, the read value is set in the DA converter 60.

As described so far, according to the present preferred embodiment, in the state where the levels of the pixel signal voltages Vx are relatively high and falls within the range of the inter-pixel variability in the characteristic curves based on light intensity—signal level, the DA converter 60, which is the AD conversion result adjuster X, fixes the AD conversion results by the column-by-column AD converters 24 to the digital pixel values corresponding to the judgment value. Accordingly, the variability of the digital pixel values Dx can be controlled. As a result, the inter-pixel variability is prevented from directly appearing in the image signal, resulting in improvement in an S/N ratio.

Preferred Embodiment 2

In the preferred embodiment 1, the reference voltage Vr is jumped to the reference voltage leap value Vrj so that the digital pixel Vx is fixed to the digital pixel value corresponding to the judgment value. In a preferred embodiment 2 of the present invention, clocks of the counters are operated until the count shows a digital pixel value corresponding to the predetermined judgment value, and the counting operation is halted after the pixel voltage value reaches the digital pixel value corresponding to the predetermined judgment value. FIG. 4 shows an operation according to the present preferred embodiment.

As is learnt from FIG. 4, the clocks to be applied are applied until the pixel voltage value reaches the reference voltage judgment value Hr, and the application is thereafter halted. Accordingly, the AD-converted data is fixed to the digital pixel value corresponding to the reference voltage judgment value Hr even though the pixel voltage value is larger than the reference voltage judgment value Hr. As a result, the same effect as that of the preferred embodiment 1 is obtained.

Preferred Embodiment 3

Figure 5:
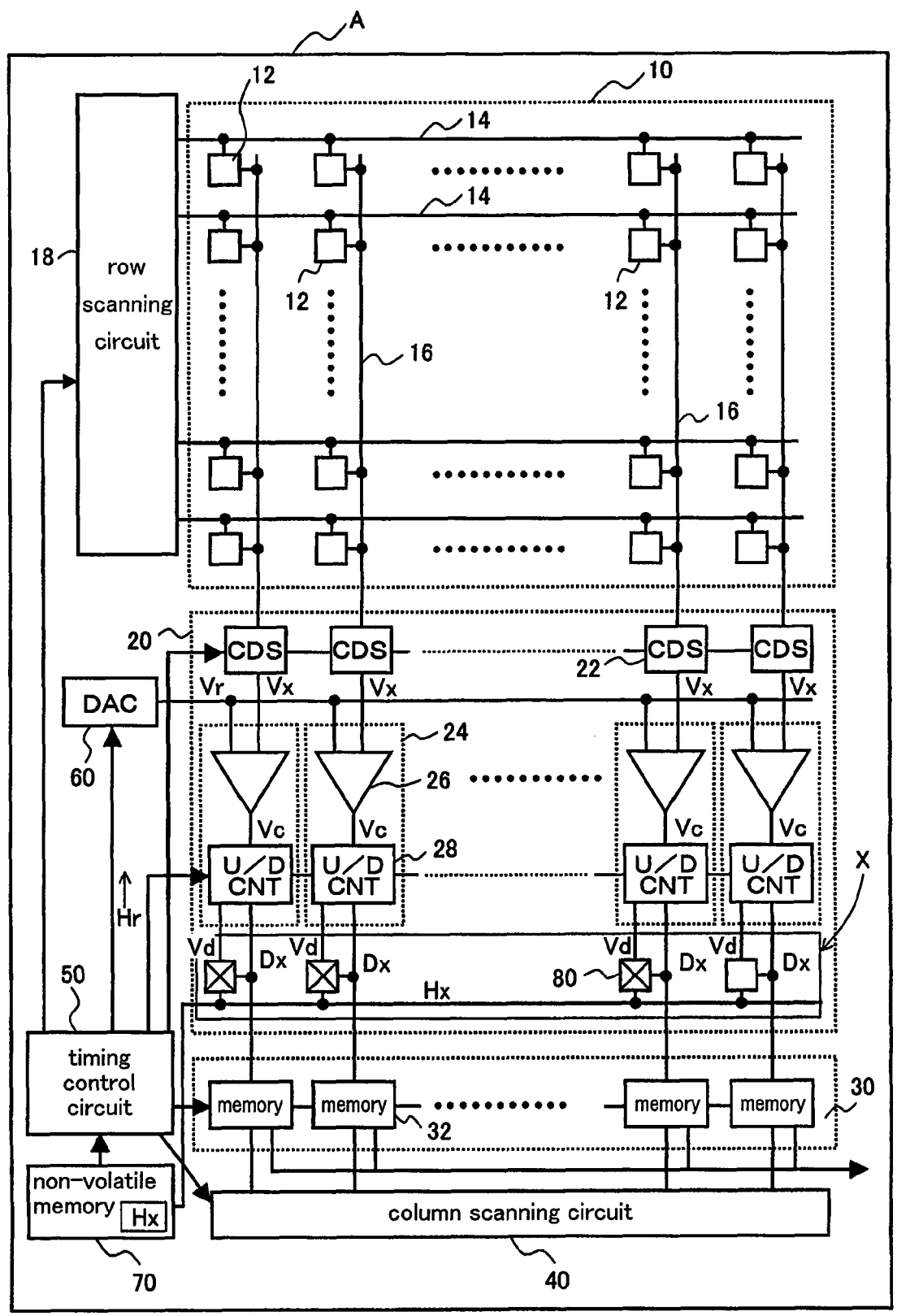
FIG. 5 is a block diagram illustrating a constitution of a solid state imaging device according to a preferred embodiment 3 of the present invention.

FIG. 5 is a block diagram illustrating a constitution of a solid state imaging device A according to a preferred embodiment 3 of the present invention. The same reference symbols shown in FIG. 5 as those shown in FIG. 1 according to the preferred embodiment 1 denote the same components. The present preferred embodiment is characterized in that digital comparing circuits 80 are further provided in the constitution according to the preferred embodiment 1. The digital comparing circuit 80 compares the count value CNT by the up-down counter 28 provided for each column to a signal voltage judgment value Hx in the non-volatile memory 70. When the count value CNT reaches the signal voltage judgment value Hx in a result of the comparison, the digital comparing circuit 80 inverts a digital comparison result Vd from "L" level to "H" level.

The digital comparing circuit 80 feeds back the digital comparison result Vd to the up-down counter 28. The up-down counter 28 halts its counting operation when the digital comparison result Vd supplied from the digital comparing circuit 80 is inverted to "H" level. In the non-volatile memory 70, the signal voltage judgment value Hx is stored. The non-volatile memory 70 supplies the signal voltage judgment value Hx stored therein to the digital comparing circuit 80.

The digital comparing circuit 80, which judges the level of the count value CNT outputted from the up-down counter 28, constitutes the AD conversion result adjuster X. In the present preferred embodiment, "whether or not the digital signal reaches the predetermined judgment value or the status equivalent to the digital signal reaching the predetermined judgment value is generated" is judged depending on whether or not the count value CNT reaches the signal voltage judgment value Hx. The rest of the constitution, which is similar to that of the preferred embodiment 1, is not described again.

Figure 6:
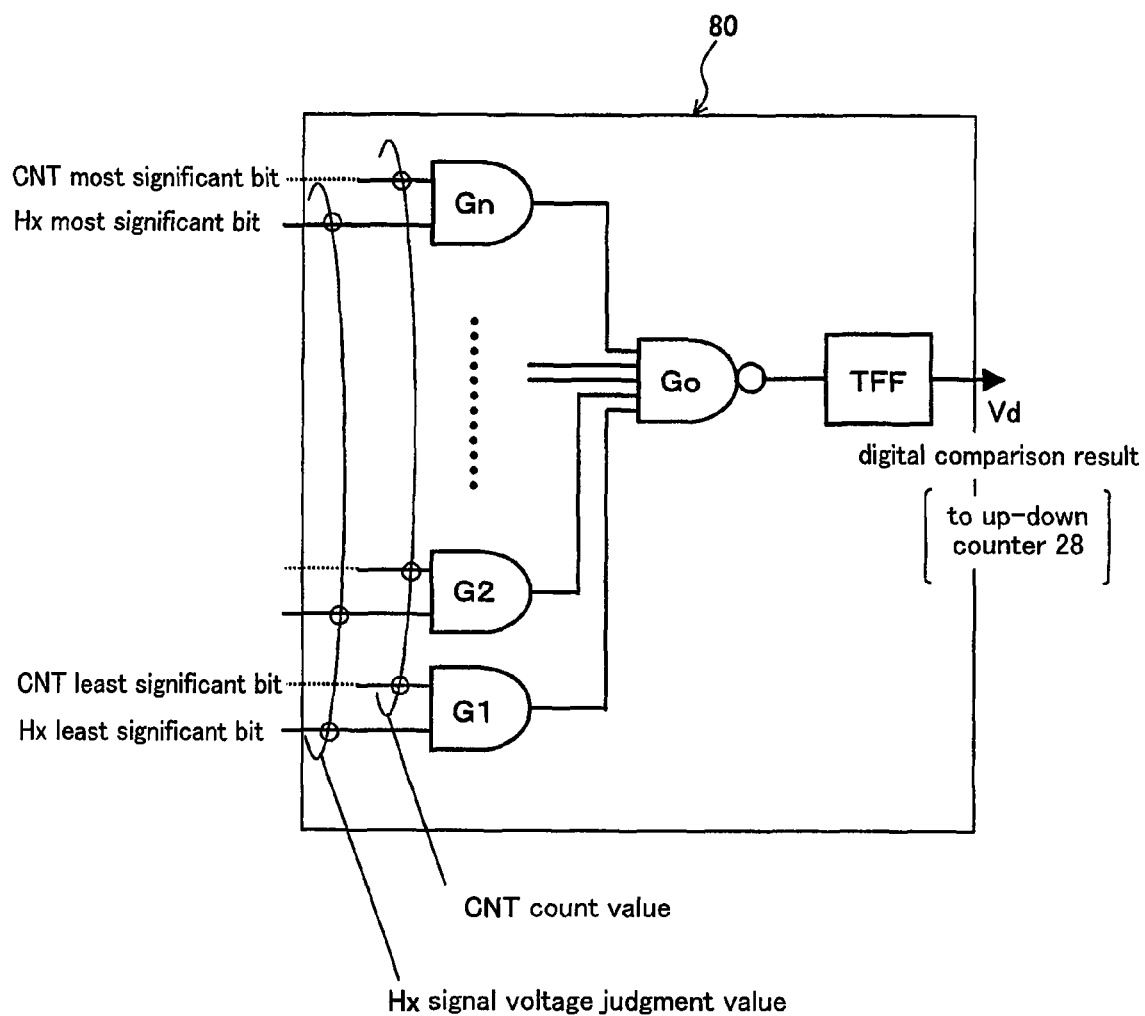
FIG. 6 is a circuit diagram illustrating an internal constitution of a digital comparing circuit according to the preferred embodiment 3.

FIG. 6 is a circuit diagram illustrating an internal constitution of the digital comparing circuit 80 according to the preferred embodiment 3. In the drawing, the bit number of the count value CNT generated by the up-down counter 28 provided for each column is n bits. The digital comparing circuit 80 provided for each column comprises n number of AND gates G1-Gn, an NAND gate Go comprising n number of input terminals, and a toggle flip-flop TFF. At each of AND gates G1 to Gn, the respective bits of the signal voltage judgment value Hx are inputted to one input of the AND gate, and respective bits of the count value CNT are inputted to the other input of the AND gate. The n number of output terminals of AND gates G1-Gn are connected to the input terminals of the NAND gate Go, and the output terminal of the NAND gate Go is connected to the input terminal of the toggle flip-flop TFF.

An operation of the digital comparing circuit 80 is described below. In the case where the respective bits of the count value CNT are equal to the respective bits of the signal voltage judgment value Hx in the n number of AND gates G1-Gn, all of the AND gates G1-Gn output "H" level. As a result of the output of "H" level from all of the AND gates G1-Gn, the NAND gate Go outputs "L" level. In the case where any of the bits is different in the respective bits of the count value CNT, it means that "L" level exits in any of the inputs of the NAND gate Go. As a result, the output of the NAND gate Go is "H" level. In other words, the NAND gate Go generally outputs "H" level; however, the output is inverted to "L" level in the case where all of the bits of the count value CNT are equal to the bits of the signal voltage judgment value Hx.

In the state where "H" level is inputted from the NAND gate Go, the toggle flip-flop TFF supplies a control signal for allowing the counting operation to the up-down counter 28. In the case where "L" level is inputted from the NAND gate Go, the toggle flip-flop TFF supplies a control signal for halting the counting operation to the up-down counter 28. The present preferred embodiment thus constituted is suitably applied to the digital double sampling by the up-down counter 28 provided for each column.

Next, an operation of the solid state imaging device A according to the present preferred embodiment is described. In the description below, the operation in the case of the digital double sampling is described. In the pixel signal outputted from the column signal wire 16, a reset component $\Delta V$ including a noise of the pixel signal, which is a reference component, is first shown, and a signal component Vsig is then shown. In the case where a first processing is implemented to the reference component (reset component $\Delta V$), a second processing is implemented to the signal in which the signal component Vsig is added to the reference component (reset component $\Delta V$).

Figure 7:
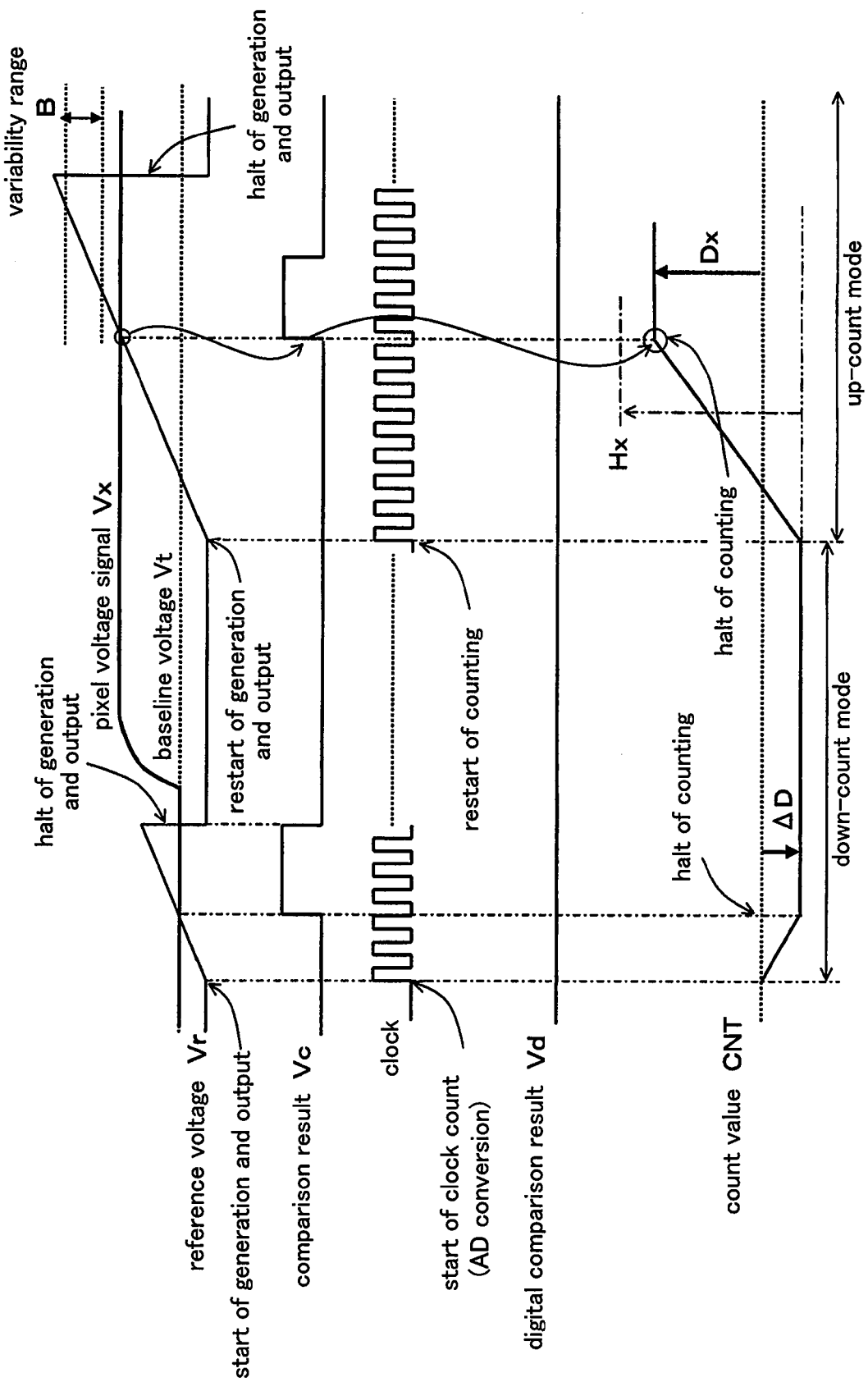
FIG. 7 is a (first) timing chart illustrating an operation of the solid state imaging device according to the preferred embodiment 3.
Figure 8:
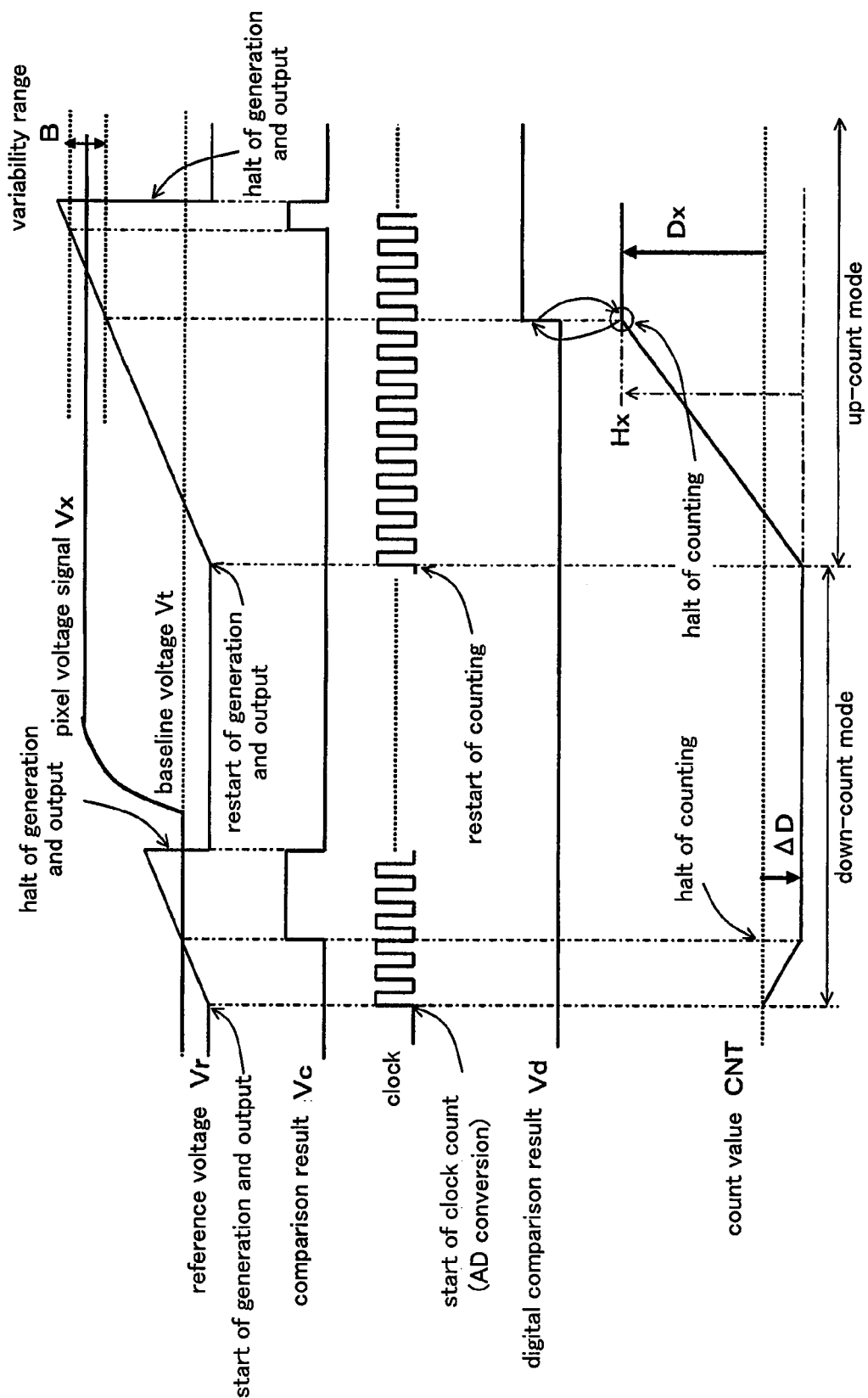
FIG. 8 is a (second) timing chart illustrating the operation of the solid state imaging device according to the preferred embodiment 3.

1) The down-counting operation in the first sampling is described first referring to first-half parts of FIGS. 7 and 8. The timing control circuit 50 gives an instruction to execute the down counting mode to the up-down counters 28. Then, the baseline voltage Vt generated by each pixel of the respective unit pixels 12 in the row selected by the row scanning circuit 18 is inputted to the comparator 26 via the analog CDS 22. The comparators 26 compare the reference voltages Vt to the reference voltage Vr supplied from the DA converter 60. At the time, the up-down counters 28 continue to down-count the reference clocks.

When the reference voltages Vr exceed the baseline voltages Vt, the comparison results Vc are inverted to "H" level, in response to which the counting operations by the up-down counters 28 are halted. Accordingly, the up-down counters 28 obtain reset components $\Delta D$ by their down-counting operations. The reset components $\Delta D$ correspond to the baseline voltages Vt. The reset components $\Delta D$ are temporarily retained in the up-down counters 28. After a first predetermined amount of time has passed, the generation of the reference voltage Vr is halted, and the comparison results Vc are inverted to "L" level.

2) After a second predetermined amount of time has passed, the second sampling is executed, which is described referring to latter parts of FIGS. 7 and 8. The second sampling is the up-counting operation. The timing control circuit 50 instructs the up-down counters 28 to execute the up-counting mode. Further, the timing control circuit 50 reads the predetermined signal voltage judgment value Hx from the non-volatile memory 70 and transfers it to the digital comparing circuits 80. The value may be transferred in the stage of 1). The analog signal of each pixel for each column in the respective unit pixels 12 in the row selected by the row scanning circuit 18 is noise-removed by the analog CDSs 22. The analog CDSs 22 supply the noise-removed analog signals to the comparators 26 as the pixel signal voltage Vx. The comparators 26 compare the pixel signal voltages Vx to the reference voltage Vr supplied from the DA converter 60. During the operation, the up-down counters 28 continue to up-count the reference clocks. In the counting operation by the up-down counter 28, the reset component $\Delta D$ obtained in the down-counting operation is used as an initial value.

Next is described an operation in the case where the level of the pixel signal voltage Vx is lower than the lower-limit value in the variability range B referring to FIG. 7. When the reference voltage Vr exceeds the pixel signal voltages Vx, the comparison results Vc are inverted, and the up-down counters 28 halt their counting operations, and thereby determine the count values CNT by their up-counting operations. The count value CNT corresponds to the pixel signal voltage Vx. The count value CNT additionally includes the offset of the reference voltage Vt. The count values CNT are temporarily retained in the up-down counters 28. The reference voltage Vr exceeds the pixel signal voltages Vx at a relatively early time point; however, the count values CNT have not yet reached the signal voltage judgment value Hx at the time point. Therefore, the digital comparing circuits 80 remain the same.

Summarizing the description so far, reference voltage Vr increases→reference voltage Vr reaches reference voltage judgment value Vx→comparison result Vc is inverted→counting operation is halted→digital pixel value Dx is determined based on counting result.

An operation in the case where the level of the pixel signal voltage Vx falls within the variability range B is described referring to FIG. 8. In this case, the count values CNT up-counted by the up-down counters 28 reach the signal voltage judgment value Hx before the reference voltage Vr exceeds the pixel signal voltages Vx. As a result, comparison results Vd of the digital comparing circuits 80 are inverted, and the up-down counters 28 correspondingly halt their up-counting operations. The up-down counters 28 thereby determine the count values CNT obtained by their up-counting operations. The count values CNT then correspond to the lower-limit value in the variability range B. The count value CNT additionally includes the offset of the baseline voltage Vt. The count values CNT are temporarily retained in the up-down counters 28. The reference voltage Vr exceeds the pixel signal voltages Vx at a relatively late time point, and the count values CNT reach the signal voltage judgment value Hx before that.

After the count values CNT are fixed to the digital pixel values Dx, the reference voltage Vr exceeds the pixel signal voltages Vx. Then, the comparison results Vc outputted by the comparators 26 are inverted; however, the count values CNT are already fixed to the digital pixel values Dx. Therefore, the inversion of the comparison results Vc does not impact the count values CNT (digital pixel values Dx).

Summarizing the description so far, reference voltage Vr increases→reference voltage Vr reaches reference voltage judgment value Vx→digital comparison result Vd is inverted→counting operation is halted→digital pixel value Dx is determined based on counting result.

As described so far, according to the present preferred embodiment, when the levels of the pixel signal voltages Vx are relatively high and fall within in the range of the inter-pixel variability in the characteristic curves based on light intensity—signal level, the digital comparing circuits 80, which serve as the AD conversion result adjuster X, fix the AD conversion results by the AD converters 24 provided for each column to the digital pixel values corresponding to the judgment value, which controls the variability of the digital pixel values Dx. As a result, the inter-pixel variability is prevented from being shown in the image signal, resulting in improvement in an S/N ratio.

In the present preferred embodiment, the digital comparison circuit 80 has n bits having the same bit accuracy as that of the AD converter 24. However, the bit number may be reduced to one bit. When the bit data for comparison is thus reduced, a circuit area can be curtailed.

Preferred Embodiment 4

In a preferred embodiment 4 of the present invention, a long-time exposure signal and a short-time exposure signal are combined in order to extend dynamic range. The tilt of an exposure signal is modest in a dark area, while the tilt is steep in a bright area. The long-time exposure signal, in which an exposure time is long, is easily saturated in the bright area, leaving the case of a dark area. The short-time exposure signal, in which the exposure time is short, is not easily saturated even in the bright area. Therefore, in the present preferred embodiment, the long-time exposure signal and the short-time exposure signal are separately fetched at an identical exposure time point and combined with each other, so that the dynamic range is extended. The identical exposure time point denotes each time point which is a unit of exposure in an imaging operation in which the exposure is periodically repeated.

A constitution of the solid state imaging device according to the present preferred embodiment is the same as that of the preferred embodiment 3 (FIG. 5). The operation thereof follows the timing chart shown in FIG. 9. The timing chart shown in FIG. 9 corresponds to the combination of the FIGS. 8 and 7 according to the preferred embodiment 3. The first-half part of the timing chart in FIG. 9 corresponds to FIG. 8, and a latter part corresponds to FIG. 7. The long-time exposure signal is detected in the first-half part, while the short-time exposure signal is detected in the latter-half part.

Figure 9:
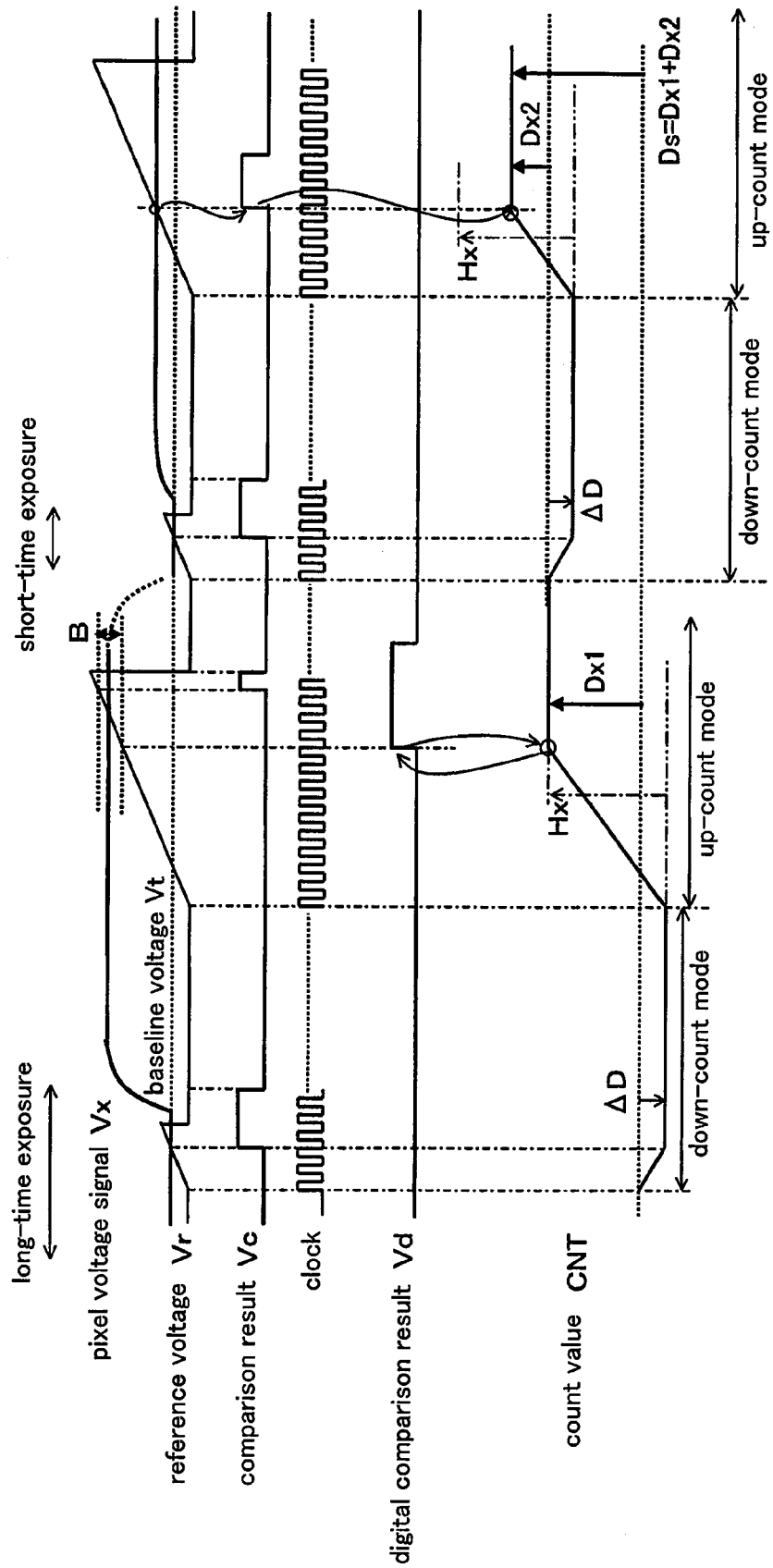
FIG. 9 is a timing chart illustrating an operation of a solid state imaging device according to a preferred embodiment 4 of the present invention.

The detection of the long-time exposure signal in the first-half part of FIG. 9 is described. In the detecting operation, since the levels of the pixel signal voltages Vx are high and within the variability range B, the count values CNT obtained in the up-counting operations by the up-down counters 28 reach the signal voltage judgment value Hx before the reference voltage Vr exceeds the pixel signal voltages Vx. As a result, the comparison results Vd of the digital comparing circuits 80 are inverted, and the up-down counters 28 correspondingly halt their up-counting operations. Accordingly, the count values CNT are fixed to the signal voltage judgment value Hx, that is a digital pixel value Dx1. The digital pixel values Dx1 then are temporarily retained in the up-down counters 28.

The detection of the short-time exposure signal in the latter-half part is described. In the detecting operation, since the levels of the pixel signal voltages Vx are far lower than the lower-limit value in the variability range B, the comparison results Vc by the comparators 26 are inverted when the reference voltage Vr exceeds the pixel signal voltages Vx, and the up-down counters 28 correspondingly halt their counting operations. Accordingly, the up-down counters 28 obtain a digital pixel value Dx2 by their up-counting operations. The digital pixel value Dx2 obtained then corresponds to a pixel signal voltage Vx2 of the short-time exposure signal. The up-down counters 28 adds the pixel signal voltage Vx2 of short-time exposure signal to the pixel signal voltage Vx1 of the long-time exposure signal obtained earlier. A digital pixel value of the signal component consequently obtained is Ds (=Dx1+Dx2).

In the detection of the long-time exposure signal in the first-half part, a case is conceivable where the levels of the pixel signal voltages Vx is lower than the lower-limit value in the variability range B; however, the inter-pixel variability in such a case is controlled by the comparison results Vc of the comparators 26.

Preferred Embodiment 5

Figure 10:
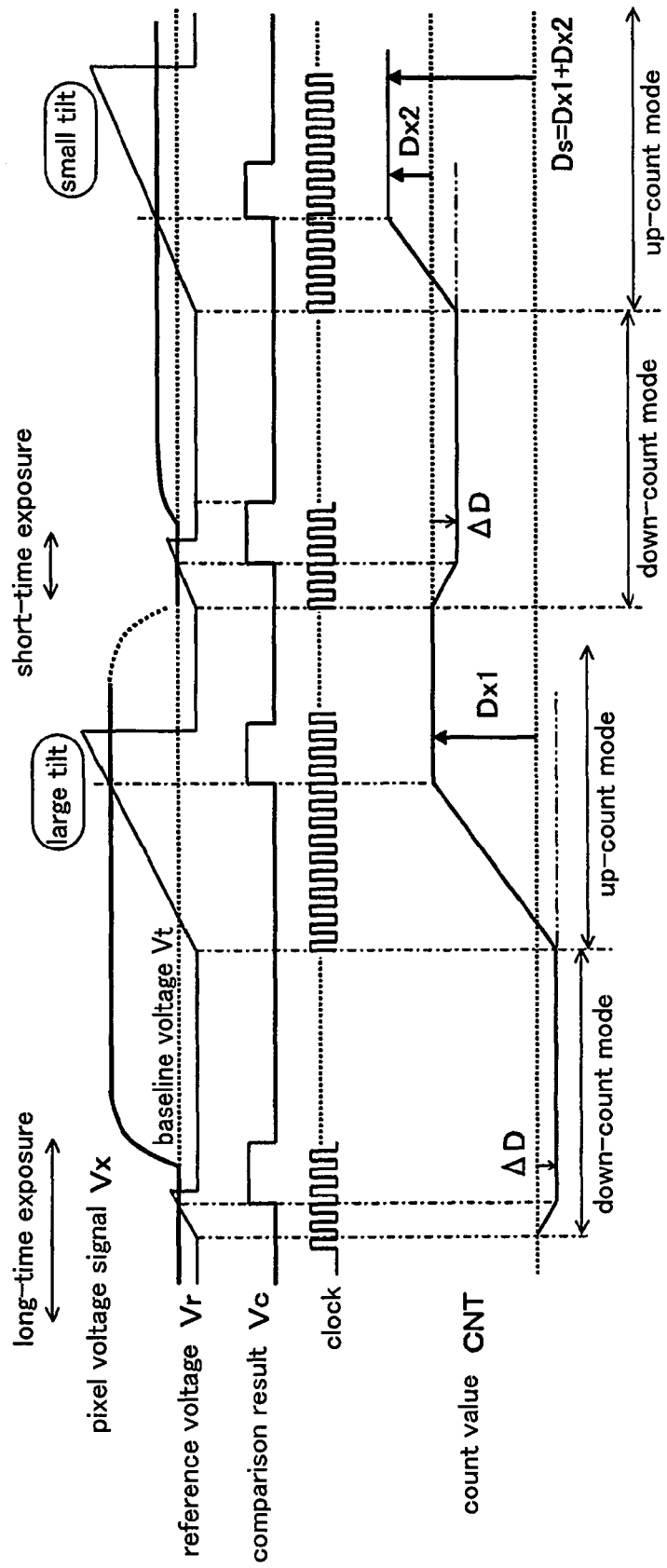
FIG. 10 is a timing chart illustrating an operation of a solid state imaging device according to a preferred embodiment 5 of the present invention.
Figure 11:
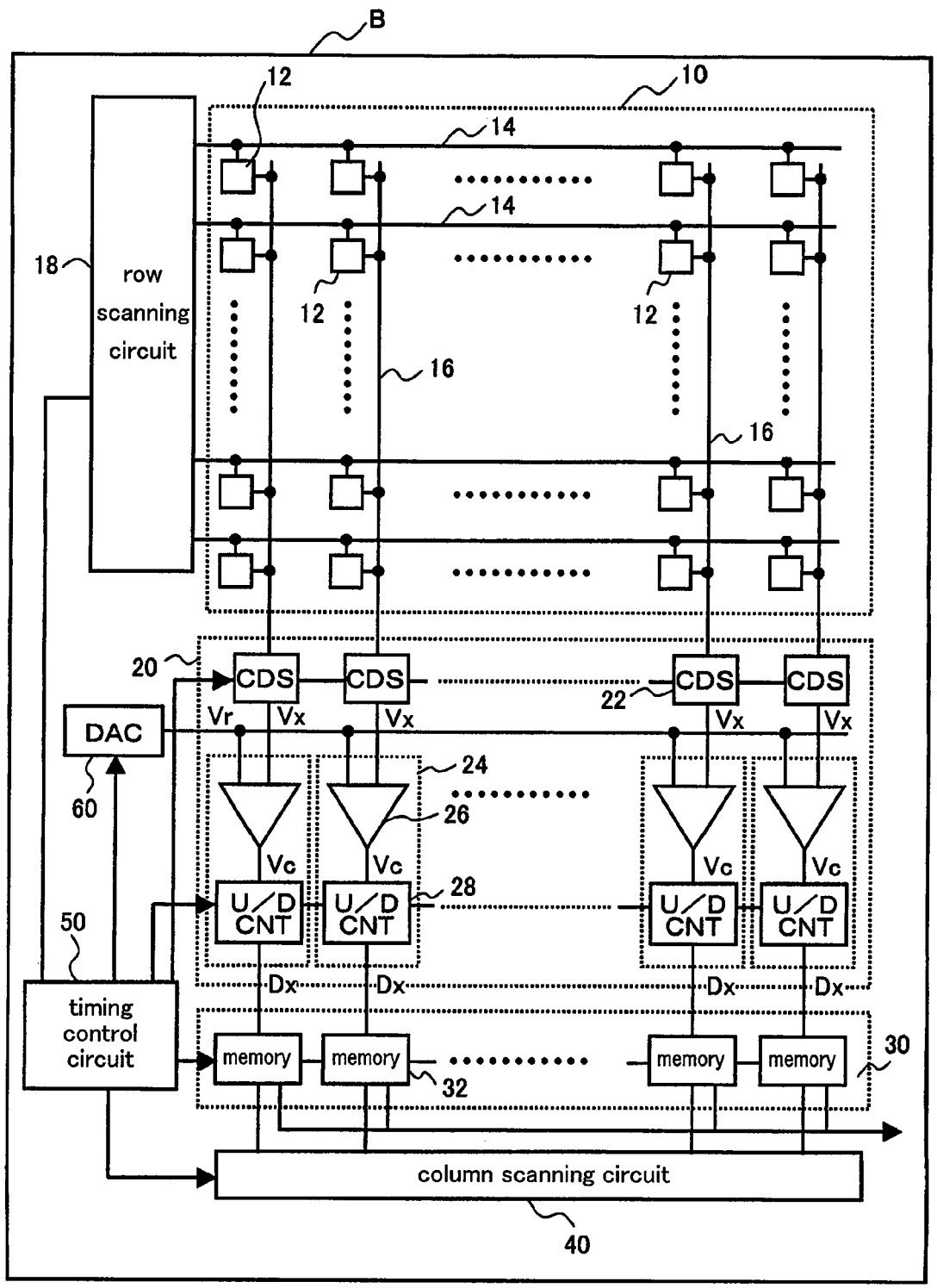
FIG. 11 is a block diagram illustrating a constitution of a conventional solid state imaging device.
Figure 12:
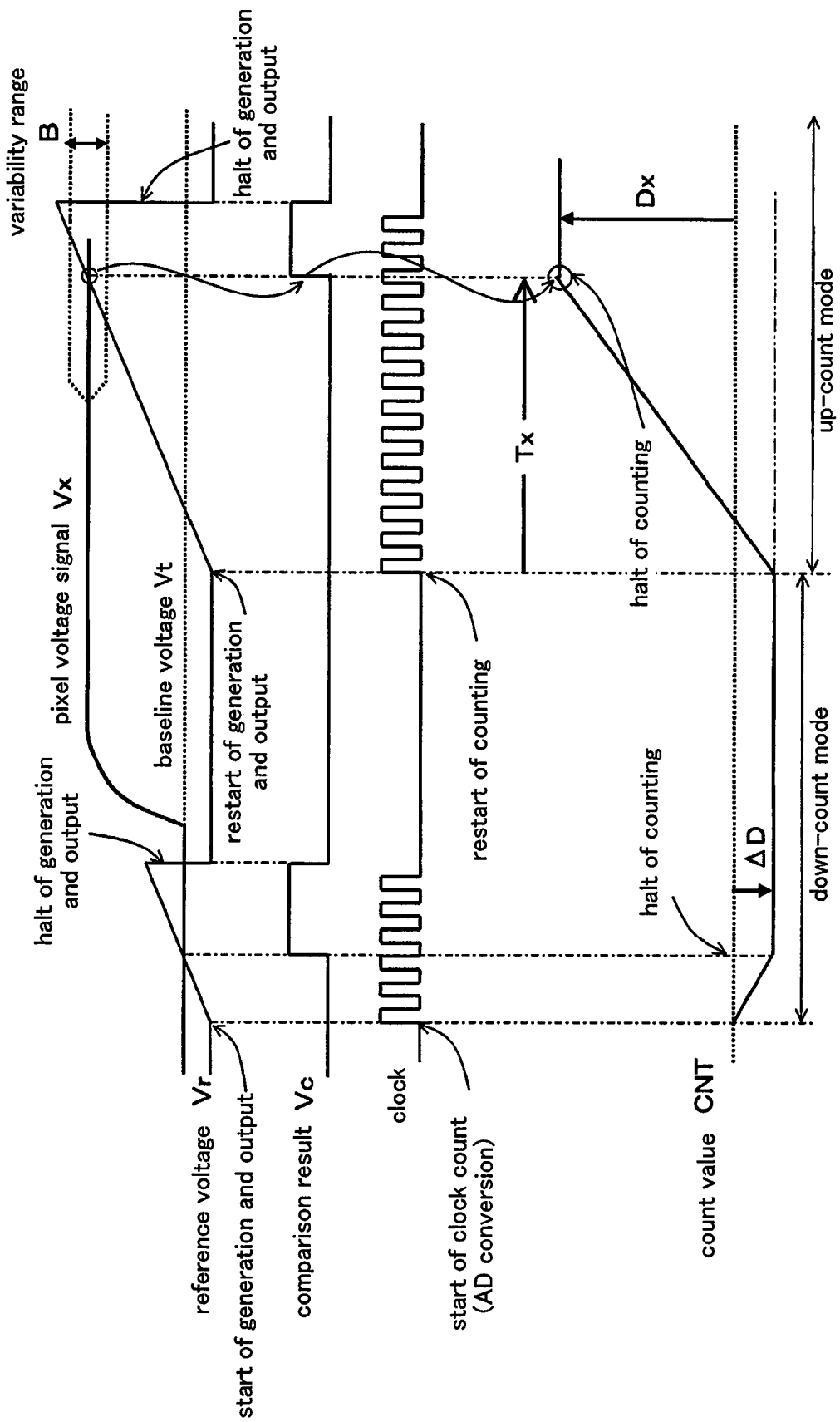
FIG. 12 is a timing chart illustrating an operation of the conventional solid state imaging device.
Figure 13:
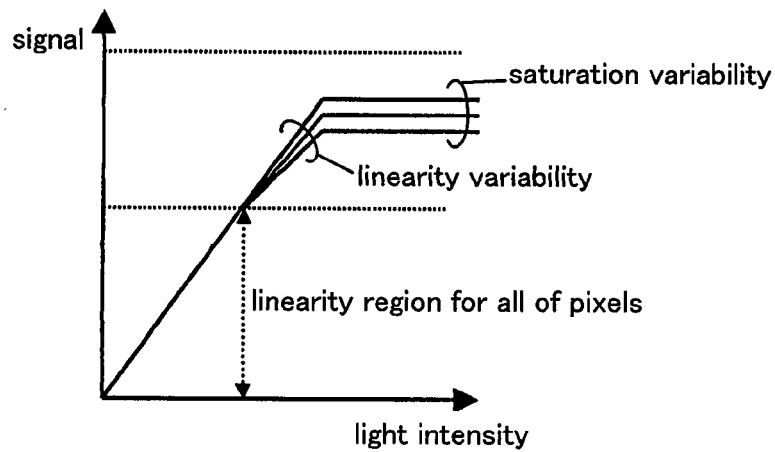
FIG. 13 is an illustration of an inter-pixel variability in characteristic curves based on light intensity—signal level.
Figure 14:
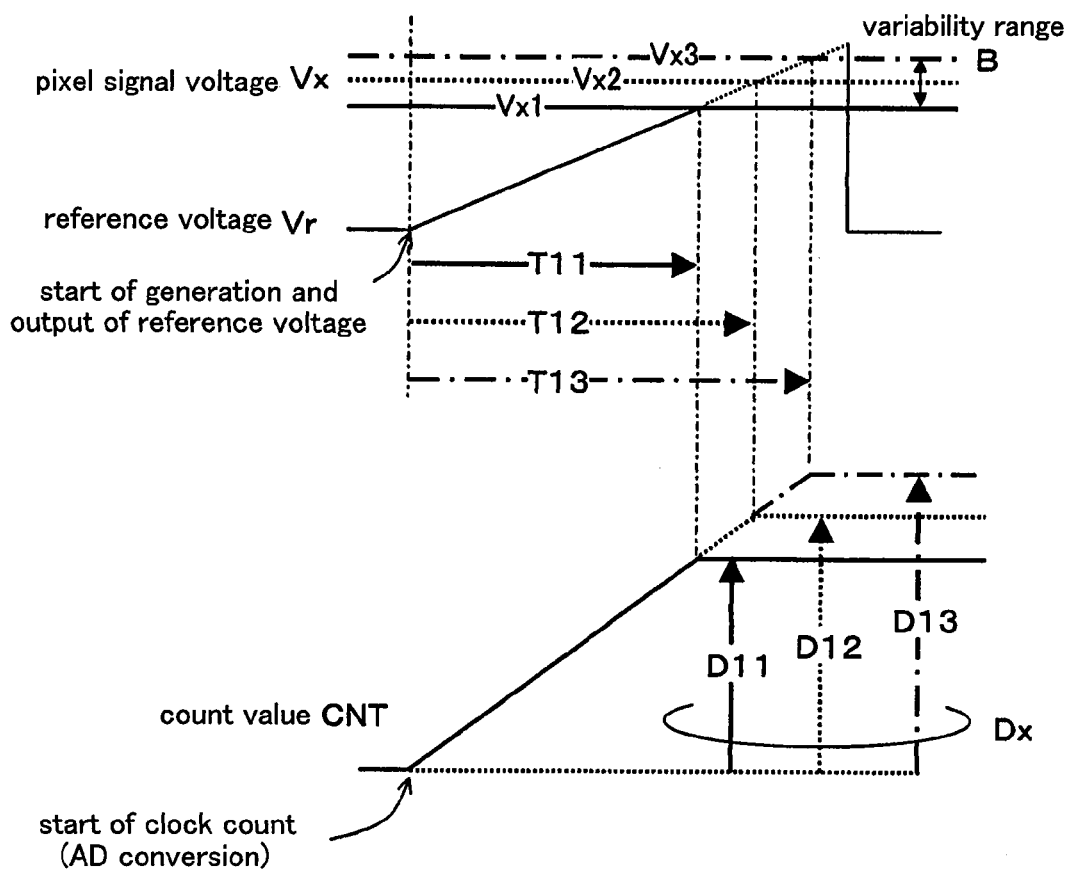
FIG. 14 is a (first) illustration of a problem to be solved.
Figure 15:
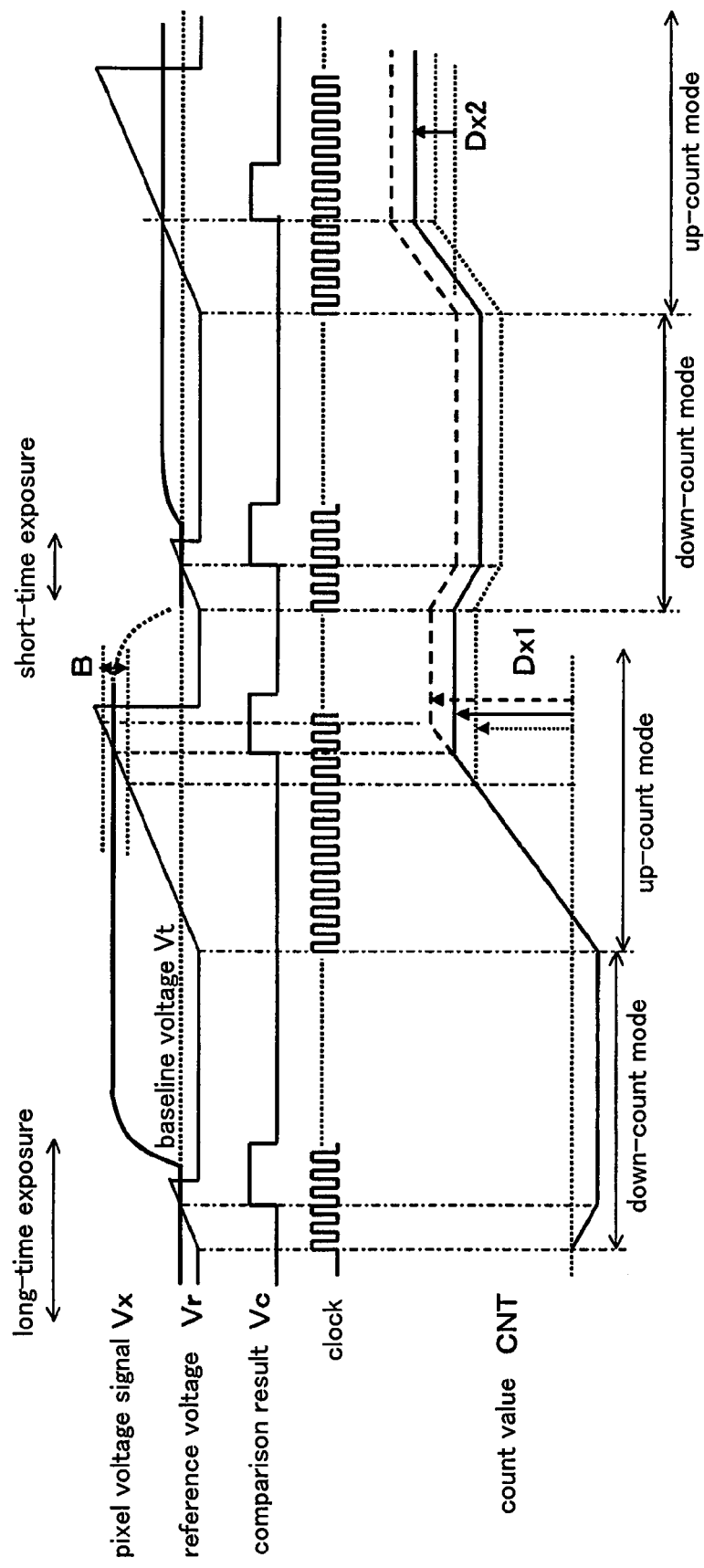
FIG. 15 is a (second) illustration of the problem to be solved.

FIG. 10 is a timing chart illustrating an operation of a solid state imaging device according to a preferred embodiment 5 of the present invention. In the present preferred embodiment, a rate of change of the reference voltage Vr over time is different (the long-time exposure has a longer rate of change over time) between the first sampling for the long-time exposure and the second sampling for the short-time exposure. As a result, an effect similar to that of the foregoing description can be obtained.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A solid state imaging device comprising:
   a pixel array unit where unit pixels each including a photoelectric conversion element are two-dimensionally arrayed in a matrix shape;
   a row scanner for selecting an arbitrary row in the pixel array unit;
   a plurality of column-by-column AD converters for separately converting voltage signals respectively outputted from the plurality of unit pixels in the selected arbitrary row into digital signals;
   a column scanner for sequentially column-scanning the digital signals outputted by the plurality of column-by-column AD converters and outputting them;
   a controller for timing-controlling the row scanner, the column-by-column AD converters and the column scanner; and
   an AD conversion result adjuster for judging whether or not the digital signals reach a predetermined judgment value or the status equivalent to the digital signals reaching the predetermined judgment value is generated, and converting the digital signals into digital pixel values set in accordance with the predetermined judgment value when a result of the judgment is positive.

2. The solid state imaging device as claimed in claim 1, wherein
   the controller sequentially executes a long-time exposure timing control and a short-time exposure timing control at an identical exposure time point, and
   the column-by-column AD converters each output a combined digital signal in which the digital signal obtained in the long-time exposure timing control executed earlier and the digital signal obtained in the short-time exposure timing control executed later are combined at the identical exposure time point as the digital signal at the identical exposure time point.

3. The solid state imaging device as claimed in claim 1, wherein
   the column-by-column AD converters each comprises:
   a reference voltage generator for outputting a reference voltage changing over time;
   a comparator for comparing each of the voltage signals outputted from a column of the plurality of unit pixels in the selected arbitrary row to the reference voltage; and
   a counter for counting a clock from a time point when the reference voltage starts to change to a time point when the reference voltage reaches the voltage signal, and outputting a count value thereby obtained as the digital signal.

4. The solid state imaging device as claimed in claim 3, wherein
the counters are up-down counters capable of switching between down-counting and up-counting operations.

5. The solid state imaging device as claimed in claim 3, wherein
the AD conversion result adjuster judges whether or not the status is generated depending on whether or not the reference voltage reaches a reference voltage judgment value.

6. The solid state imaging device as claimed in claim 3, wherein
the reference voltage generator generates a signal in which a voltage is arithmetically changed over time as a reference voltage.

7. The solid state imaging device as claimed in claim 3, wherein
the AD conversion result adjuster judges whether or not the status is generated depending on whether or not the count value reaches a threshold value set in accordance with the predetermined judgment value.

8. The solid state imaging device as claimed in claim 1, wherein
the predetermined judgment value is set based on a maximum value of the voltage signal at which the voltage signal can maintain a linearity characteristic with respect to an amount of incident light from the photoelectric conversion elements.

9. The solid state imaging device as claimed in claim 1, wherein
the AD conversion result adjuster judges whether or not the status is generated depending on whether or not the reference voltage reaches a reference voltage judgment value, and changes the reference voltage to a value larger than a maximum amplitude of the voltage signal when a result of the judgment is positive.

10. The solid state imaging device as claimed in claim 1, further comprising a non-volatile memory capable of memorizing the predetermined judgment value and transferring the memorized predetermined judgment value to the AD conversion result adjuster.

11. The solid state imaging device as claimed in claim 10, wherein
the predetermined judgment value is set based on a maximum value of the voltage signal at which the voltage signal can maintain a linearity characteristic with respect to an amount of incident light from the photoelectric conversion elements, and
the non-volatile memory memorizes the predetermined judgment value measured when the solid state imaging device is manufactured.

12. The solid state imaging device as claimed in claim 1, wherein
the controller includes a first timing control mode for executing a single exposure timing control at an identical exposure time point and a second timing control mode for sequentially executing a long-time exposure timing control and a short-time exposure timing control at the identical exposure time point, and
the AD conversion result adjuster is operated in the second timing control mode.

13. The solid state imaging device as claimed in claim 12, wherein
the Ad conversion result adjuster is also operated in the first timing control mode.

14. The solid state imaging device as claimed in claim 13, wherein
the AD conversion result adjuster sets the reference voltage judgment values which are different to each other between in the first timing control mode and the second timing control mode.

15. The solid state imaging device as claimed in claim 12, wherein
the AD conversion result adjuster controls the reference voltage generator so that a rate of change over time of the reference voltage in the first timing control mode and a rate of change over time of the reference voltage in the second timing control mode are different to each other.

16. The solid state imaging device as claimed in claim 7, wherein
the AD conversion result adjuster sets a predetermined judgment value based on a maximum value of the voltage signal at which the voltage signal can maintain a linearity characteristic with respect to an amount of incident light from the photoelectric conversion elements, and
the AD conversion result adjuster sets a rate of change over change of the reference voltage over time by controlling the reference voltage generators so that the reference voltage can reach the threshold value within an operation time of the counters.

17. The solid state imaging device as claimed in claim 1, further comprising a line memory for temporarily memorizing the digital signals between the column-by-column AD converters and the column scanner.

18. The solid state imaging device as claimed in claim 1, wherein
the pixel array unit comprises a column signal wire, and a plurality of column-by-column analog CDSs are further provided between the column signal wire and the plurality of column-by-column AD converters.

19. A method of driving a solid state imaging device including:
a selecting step for selecting unit pixels on a row-by-row basis in a pixel array unit where the unit pixels each including a photoelectric conversion element are two-dimensionally arrayed in a matrix shape;
a converting step for converting voltage signals outputted respectively from a column of the plurality of unit pixels in the row selected in the selecting step into digital signals; and
an outputting step for sequentially outputting the digital signals by a column-scanning operation thereof, wherein
in the converting step, it is judged whether or not the digital signals reach a predetermined judgment value or the status equivalent to the digital signals reaching the predetermined judgment value is generated, and the digital signals are fixed to digital pixel values set in accordance with the predetermined judgment value when a result of the judgment is positive.

20. The method of driving a solid state imaging device as claimed in claim 19, wherein
a long-time exposure timing control and a short-time exposure timing control are sequentially executed at an identical exposure time point in the selecting step, the converting step, and the output step, and
in the converting step, a combined digital signal in which the digital signal obtained in the long-time exposure timing control executed earlier at the identical exposure time point and the digital signal obtained in the short-time exposure timing control executed later are combined is used as the digital signal at the identical exposure time point.

21. The method of driving a solid state imaging device as claimed in claim 18, wherein
in the converting step, it is judged whether or not the status is generated depending on whether or not the reference voltage reaches a reference voltage judgment value, and the reference voltage is changed to a value larger than a maximum amplitude of the voltage signal when a result of the judgment is positive.

22. The method of driving a solid state imaging device as claimed in claim 19, wherein
in the converting step, an counting operation is continued from a time point when a reference voltage changing over time starts to change to a time point when the reference voltage reaches the voltage signal, and a count value thereby obtained is outputted as the digital value.

23. The method of driving a solid state imaging device as claimed in claim 22, wherein
in the converting step, it is judged whether or not the status is generated depending on whether or not the count value reaches a threshold value set in accordance with the predetermined judgment value.

* * * * *